United States Patent
Budic

(10) Patent No.: US 7,038,618 B2
(45) Date of Patent: May 2, 2006

(54) METHOD AND APPARATUS FOR PERFORMING BISTATIC RADAR FUNCTIONS

(76) Inventor: Robert D. Budic, 3000 R St. NW., Washington, DC (US) 20007-2922

( * ) Notice: Subject to any disclaimer, the term of this patent is extended or adjusted under 35 U.S.C. 154(b) by 0 days.

(21) Appl. No.: 11/103,128

(22) Filed: Apr. 11, 2005

(65) Prior Publication Data

US 2005/0237236 A1      Oct. 27, 2005

Related U.S. Application Data

(60) Provisional application No. 60/565,376, filed on Apr. 26, 2004.

(51) Int. Cl.
*G01S 13/72* (2006.01)
*G01S 13/524* (2006.01)
(52) U.S. Cl. .................. 342/195; 342/159; 342/160
(58) Field of Classification Search .......... 342/159, 342/160, 195
See application file for complete search history.

(56) References Cited

U.S. PATENT DOCUMENTS

| | | | | |
|---|---|---|---|---|
| 4,746,924 A * | 5/1988 | Lightfoot | .............. | 342/159 |
| 5,534,868 A * | 7/1996 | Gjessing et al. | .......... | 342/26 D |
| 5,793,798 A * | 8/1998 | Rudish et al. | .............. | 375/260 |
| 6,744,408 B1 * | 6/2004 | Stockmaster | .............. | 342/453 |
| 6,861,976 B1 | 3/2005 | Budic | | |
| 2002/0053982 A1 * | 5/2002 | Baugh et al. | .............. | 340/945 |
| 2005/0242985 A1 * | 11/2005 | Ponsford et al. | .......... | 342/195 |

FOREIGN PATENT DOCUMENTS

| | | | |
|---|---|---|---|
| EP | 0893703 A1 * | 1/1999 | |
| GB | 2251351 A * | 1/1992 | |

OTHER PUBLICATIONS

Adaptive space/frequency processing for distributed aperture radars, Adve, R.; Schneible, R.; McMillan, R.; Radar Conference, 2003. Proceedings of the 2003 IEEE, May 5-8, 2003 Page(s):160-164 Digital Object Identifier 10.1109/NRC.2003.1203396.*

* cited by examiner

*Primary Examiner*—Ian J. Lobo
(74) *Attorney, Agent, or Firm*—24 IP Law Group USA, PLLC; Timothy R. DeWitt

(57) ABSTRACT

A bistatic radar system having a transmitter that generates unique signals at spatially independent transmitter degrees of freedom and a receiver that filters the signal at each receiver degree of freedom into a group of signals identical in number to the number of transmitter degrees of freedom. The receiver formats the filtered signals into a 2-dimensional array of elements. The receiver rotates the array so that the new axes are aligned with the Doppler gradient. The data is then re-sampled and projected to linearize the clutter signal. The receiver may be integrated with a broad class of adaptive and non-adaptive clutter mitigation approaches such as electronic clutter tuning and projected bistatic space-time adaptive processing, or STAP.

18 Claims, 10 Drawing Sheets

METHOD AND APPARATUS FOR PERFORMING BISTATIC RADAR FUNCTIONS

CROSS-REFERENCE TO RELATED APPLICATIONS

This application claims the benefit of U.S. Provisional Application Ser. No. 60/565,376 filed on Apr. 26, 2004 by inventor Robert Budic.

Other related patent applications include the following:

"Adaptive Broadcast Radar," U.S. Provisional Application Ser. No. 60/253,095; Filed on Nov. 28, 2000; Inventor: Robert D. Budic.

"System and Method for Adaptive Broadcast Radar System," U.S. Pat. No. 6,861,976, issued Mar. 1, 2005; Inventor: Robert D. Budic.

The entirety of each of the aforementioned patent applications is incorporated by reference herein.

STATEMENT REGARDNING FEDERALLY SPONSORED RESEARCH OR DEVELOPMENT

Not applicable.

BACKGROUND OF THE INVENTION

1. Field of the Invention

This invention relates to techniques for performing bistatic radar functions when a transmitter platform is in motion.

2. Brief Description of the Related Art

Radar systems may be monostatic, bistatic or multistatic systems. Monostatic radar systems consist of a transmitter and receiver that are collocated on the same platform. A bistatic radar system performs radar functions but does not require the transmitter and receiver to be collocated. A multistatic radar system has multiple receivers that are separated from one transmitter or one receiver that is separated from multiple transmitters or multiple receivers that are separated from multiple transmitters. Such transmitter and receiver platforms may be stationary (ground-based) or may be in motion.

A transmitted radar signal is scattered by all material objects. Knowledge of the transmitted signal is desirable at the receiver if information is to be extracted from the target path signal. The strength of the scattered signal is determined by the direction and orientation of the source relative to the radar antenna beam directions, by the distances from the radar to the source, by electromagnetic properties of the source and the electromagnetic properties of the transmitter and receiver hardware. A time or phase reference is desired if the total scattered path length is to be determined. The transmitted frequency also is desired to determine the Doppler frequency shift. In a bistatic or multistatic system, the time reference also may be obtained from the direct path signal provided the distance between the transmitter and the receiver is known. The frequency reference may be obtained from a direct path signal received from the transmitter provided the transmitter and receiver velocities are known.

The material objects that scatter the transmitted signal define a multipath environment. The multipath environment will, in general, include objects that are of interest to the radar operator as well as objects that are not of interest. Those objects of interest in the multipath environment are called targets. Those objects that are not of interest are called clutter. Ground clutter refers to the multipath sources on the earth's surface and includes both natural vegetation and man-made structures. Ground clutter is often modeled as stationary, but does include motion due to the rotation of the earth and may have internal motion, such as due to wind. Ground clutter may also include surface vehicles, animals or people and may be non-stationary due to motion from one point to another during the period that the radar is operating.

Decisions about the presence of a target of interest are called detection decisions. Detection decisions are based on the output products of algorithms that process the radar signal.

Known radar systems may transmit a signal beam in a specific direction to search for targets. Once a target has been detected, a beam or multiple beams may be directed to follow the target. The receiver may receive scattered signals reflected off the target. By knowing the transmitter beam parameters, the receiver may perform operations to determine the target parameters, as discussed above.

The performance of a radar system is characterized by its capability to reliably detect targets of interest while maintaining a low false alarm rate and by its capability to derive accurate estimates of target position and motion. For some radar systems, performance may be further characterized by the capability to classify or identify the target of interest.

Radar measurements are derived from the received radar signal. Measurements commonly include signal strength, delay, Doppler and angle of arrival. Delay corresponds to the propagation time from transmitter to scatterer and back to receiver. Doppler corresponds to the shift in frequency of the scattered signal relative to the transmitted signal. The angle of arrival refers to the direction from the radar antenna to the scatterer relative to the boresight direction of the antenna.

Measurements may be computed prior to, simultaneously with or after detection decisions. Algorithms may be applied to measurements to derive estimates of the location and motion of a scattering source.

An ideal radar scenario is one for which the roll, yaw and pitch of the radar platform can be ignored, one for which radar hardware imperfections such as array mis-alignment can be ignored and one for which clutter motion, clutter inhomegeneity and jammers can be ignored.

The cone angle is the angle between the radar platform heading and a vector from the platform to a clutter sample. For linear side-looking arrays, the azimuth angle is defined as $\pi/2 - \theta_{cone}$.

The clutter locus describes the simultaneous measurement of Doppler and the sine of the cone angle for clutter samples distributed over the radar field of view (FOV). The clutter locus depends on the radar system and the clutter environment. For a selected ideal radar system, the clutter locus associated obtained for a selected radar scenario is called the Characteristic Clutter Locus.

A display of a Characteristic Clutter Locus for an ideal monostatic radar is shown in FIG. 1. The space-time aperture represents the simultaneous measurement of Doppler and the sine of azimuth angle of arrival. FIG. 1 shows the distribution of clutter measurements in the space-time aperture for typical airborne radar. The clutter includes sources that are spread over multiple range cells. The Doppler of a clutter sample depends directly on the azimuth of the clutter sample relative to the platform.

The Characteristic Clutter Locus for an ideal monostatic radar is linear. The slope of the linear clutter locus depends on the magnitude of the platform velocity and the orientation ($\theta_0$) of the array relative to the platform motion.

The slope of the Characteristic Clutter Locus for an ideal monostatic radar is delay independent. When ambiguous sidelobe returns are included, the Characteristic Clutter Locus will be a set of equally spaced lines each with the same slope.

The performance of a radar system can be compared to a notional system in which clutter is not present. The difference between the received signal in an actual radar system and the notional radar system is called the clutter signal. The difference in performance between a radar system and the clutter-free radar system in which clutter is not present is called the degradation in performance due to clutter. The clutter signal is treated as one type of interference that degrades radar system performance.

The radar system performance may be also be degraded by a component of the transmitted signal which propagates from the transmitter directly into the receiver system without scattering by the multipath environment. This is a second type of interference and called direct path interference.

A third type of interference is due to transmitters that operate either intentionally or unintentionally at or near the radar center frequency. Transmitters that operate intentionally at or near the radar center frequency are called jammers. Transmitters that operate unintentionally are called co-channel transmitters. The interference signal due to jammers and co-channel transmitters may also include the effect of scattering by the multipath environment.

For monostatic radars, pulsed waveforms have been traditionally used by radars to mitigate direct path interference.

For monostatic radars, adaptive antennas have been developed to suppress the direct path component of jammer and co-channel interference sources. Adaptive antenna technology requires a radar antenna that has multiple, independent channels. Independent spatial channels may be derived from the output of distinct elements in a phased array, from the output of distinct sub-arrays that are created as a combination of feeds or elements or from separate antenna beams formed as a combination of weighted data at the output of antenna elements or feeds. The technology to form sub-arrays or multiple beams can be embedded in the design of the antenna hardware or implemented as a module or modules in the digital signal processor. It is adaptive in the sense that processing parameters depend on the interference signal. Adaptive antenna technology has been developed for ground-based radars and for radars on moving platforms.

For monostatic ground-based radars, moving target indication (MTI) and Doppler radar were developed to suppress the stationary ground clutter and improve the detectability of moving targets. For such a ground-based radar, all clutter has zero-Doppler and is concentrated in a single Doppler measurement cell. A filter designed to cancel zero-Doppler measurements has the effect of suppressing background clutter. As long as the target is not flying in a direction orthogonal to the radar's look direction (in which case it is as zero-Doppler and is filtered out along with the background clutter), the target signal passes through the filter without significant attenuation or distortion and target detection is no longer strongly degraded by the presence of background clutter.

In monostatic airborne and space borne radar systems, ground clutter is a greater challenge primarily because it is spread throughout a large region of the delay and Doppler measurement space. The spread of ground clutter is, in general, a direct result of the radar's platform motion. The ground clutter generates an interference signal that is distributed throughout the measurement space and masks targets that might otherwise be detectable.

Displaced Phase Center Aperture (DPCA) processing and Space-time adaptive processing (STAP) were invented as a technique to suppress stationary ground clutter when monostatic radars are deployed on moving platforms for the purpose of detecting moving targets.

DPCA sensor and processing parameters do not depend on the clutter environment and in this sense are non-adaptive or deterministic. DPCA is applied to receiver data before detection processing and measurement estimation.

At the foundation of monostatic clutter suppression techniques such as STAP is the observation that clutter can be discriminated from target signals, even when they occupy the same range and Doppler measurement cell. The Doppler of a clutter cell depends linearly on the cosine of cone angle of the clutter relative to the platform heading. Conceptually, this linear relationship defines, for each Doppler cell, a unique cone angle associated with the clutter source. A moving target for which the velocity component in direction of the radar motion is non-zero cannot have identical Doppler and cone angle measurements as the clutter. The difference between target and clutter cone angle measurement increases as a function of the target velocity component in the direction of the radar platform heading. The placement of a null in the antenna pattern in the direction of the clutter source will effectively eliminate clutter returns for that Doppler cell. Moving target returns may also be attenuated but this attenuation will be much less than the attenuation of clutter for those targets with sufficiently large velocity component in the direction of the radar platform heading. Thus, the detectability of moving targets is improved. As the speed of a target is reduced, the characteristics of the target signal will become similar to the characteristics of the clutter signal and will be suppressed along with clutter.

The quantity, Minimum Detectable Velocity (MDV), characterizes the capability of DPCA and STAP algorithms to detect slow-moving targets. Signal to Interference-Plus-Noise Ratio (SINR) compares the strength of target signals to the combined signal consisting of interference or clutter and noise. SINR Loss describes the characterizes the performance of DPCA and STAP algorithms to a interference-free environment.

STAP improves performance in the presence of both clutter and interference due to jammers or co-channel transmitters. STAP can further compensate for mismatch in the RF characteristics between antenna and receiver subsystems for the independent radar phase centers.

The application of STAP algorithms to radar data requires a radar antenna, similar to that described for adaptive antennas, with multiple independent channels or outputs.

Coherent digital signal processing is commonly used to filter each channel of received data, prior to STAP processing, into a set of multiple data streams that are naturally associated with multipath sources at approximately, the same delay. Each specific delay value and the variation in the delay value of filtered clutter samples is termed a delay bin. The variation in the delay value depends on the signal bandwidth and is commonly referred to as delay resolution or equivalently the extent of the delay bin. The filtering of each channel of receiver data into delay bins is commonly called delay processing or matched filter processing. The pulse repetition interval (PRI) defines the segment of transmitted signal that is used to compute the matched filter output. The Pulse Repetition Frequency (PRF) is defined as the inverse of the PRI.

For waveforms designed as a repeating pulse train, the PRI corresponds to the interval between two successive pulses. For non-recurring waveforms, the PRI is not naturally defined by the signal structure and can be specified as an independent signal or processing parameter. The extent of PRI in this case may be defined, for example, to ensure that certain MF performance measures are met. Performance measures might include expected signal-to-noise ratio (SNR) or de-correlation due to expected motion of scatterers during the PRI.

Coherent digital signal processing can also be used to filter each channel into a set of multiple data streams that are naturally associated with multipath sources at approximately the same delay and at approximately the same Doppler shift. Each specific delay and Doppler value and the variation in the delay and Doppler value of filtered clutter samples is termed a delay-Doppler or measurement bin. The variation in the Doppler value depends on the duration of the coherent integration interval and is commonly referred to as Doppler resolution or equivalently the extent of the Doppler bin. The filtering of each channel of receiver data into delay-Doppler bins is commonly called delay-Doppler processing, ambiguity surface processing and complex ambiguity function (CAF) processing. The coherent processing interval (CPI) defines the segment of transmitted signal that is used to compute the CAF output.

Degrees of Freedom (DOF's) correspond to data values at the output of the radar signal processor. A three-dimensional index is commonly used to parameterize DOF's. The three-dimensional index identifies a unique receiver element called the spatial DOF, a unique PRI called the slow-time DOF and a unique delay bin called the fast-time DOF.

The number of spatial DOF's is represented by K, the number of fast-time DOF's by M and the number of slow-time DOF's by N. The total number of independent DOF's is the product of temporal and spatial DOF's and is equal to K·M·N.

Statistical properties of the interference signal are described by the covariance, R, between the spatial and temporal DOF's. The eigenvalues and eigenvectors of the covariance provide an equivalent representation or basis for the statistical properties of the interference signal. The number of eigenvalues/eigenvectors is equal to K·M·N, the number of independent DOF's. The order or rank of a covariance matrix is equal to the number of eigenvalues/eigenvectors.

In some cases, it may be possible to describe the statistical characteristics of clutter and other sources of interference by a lower dimensional set of basis vectors. The rank of the clutter and/or interference is defined as the number of basis vectors required for this representation. The rank of clutter or interference data may be less than the rank of the full covariance matrix.

For a monostatic radar scenario, the clutter rank may be significantly less than the rank of the full covariance matrix. For an ideal monostatic radar scenario, fast-time DOF's are not required for clutter suppression and M is typically set equal to 1. The clutter rank is an estimate of the number of significant eigenvalues. For an ideal monostatic radar scenario, the rank of the interference is approximately $K+(N-1)\beta$ where $\beta$ is a factor of 2 times the ratio of distance traveled by the radar platform during the time between radar pulses and the separation between spatial DOF's. A measure of the rank reduction is the ratio of $K+(N-1)\beta$ to the product K·N.

The reduced rank of clutter is a direct consequence of the linearity of the clutter locus. This is commonly referred to as "Brennan's rule".

The desired response for a STAP processor is defined by a space-time steering vector, $\bar{v}$.

The optimum STAP processor, $\bar{w}$, depends on the covariance and the selected steering vector: $\bar{w}=R^{-1}\bar{v}$. The computational complexity is typically dominated by the need to determine the inverse of the covariance.

In practice, an estimate of the covariance for a selected delay bin is derived from data in neighboring bins. This data is referred to as training data. The clutter rank for training data in an ideal monostatic scenario that is the same as the clutter rank for the selected delay bin. In addition, for an ideal monostatic scenario, the statistical characteristics of covariance estimate based on training data are similar to that of the ideal covariance and when the amount of training data is approximately twice the order of the covariance, the achieved performance is roughly within 3 dB of that for the optimum STAP processor.

Because the both the computational complexity and the size of training data increase with the order of the covariance, techniques to reduce the rank or dimensionality of data at the input of the STAP processor are commonly employed.

One class of techniques uses non-adaptive or deterministic processing and is referred to as subspace projection. Sub-space projection techniques include Post-Doppler STAP in which slow-time DOF's are defined at the output of CAF processing. Staggered PRF, as an example of Post-Doppler STAP techniques. For Staggered PRF, the slow-time DOF's are defined by a sequence of over-lapping CPI's. Adjacent cell Post-Doppler STAP is another example of Post-Doppler STAP techniques where slow-time DOF's are derived from data in neighboring Doppler bins.

Sub-space projection techniques also include Beamspace STAP in which spatial DOF's are reduced by application of a set of distinct, fixed aperture weights to the spatial DOF's and the summation of the weighted data. The fixed aperture weights may be employed to form a set of fixed, overlapping radar beams where each radar beam has a unique beam center. The fixed aperture weights may also be employed to define overlapping sub-arrays where the phase centers of the set of sub-arrays are spatially separated. The formation of independent and distinct beams or sub-arrays for Beamspace STAP may be embedded in the design of the antenna hardware or implemented as a module or modules in the digital signal processor.

Post-Doppler and Beamspace STAP techniques can be employed separately or in combination as a STAP pre-processor such as for the Joint Domain Localized Generalized Likelihood Ratio Detector (JDL-GLR).

Another class of techniques, Reduced Rank STAP algorithms, use adaptive processing to exploit the fact that inherent dimensionality or rank of clutter or may be significantly lower than the rank of the covariance matrix. Reduced Rank STAP algorithms include Principal Components, Eigenfilters and the Cross-Spectral Metric. Reduced Rank STAP algorithms also include Multi-stage Wiener Filters (MWF) and Parametric Matched Filters (PMF) that do not explicitly require knowledge or estimation of the covariance. Reduced Rank STAP algorithms can also be combined with Post-Doppler and Beamspace techniques.

Diagonal loading and covariance matrix tapers can be employed to compensate for internal clutter motion and clutter non-stationarity.

The inclusion of fast-time DOF's and a technique referred to as 3-D STAP has been developed to suppress multipath scattering by a jammer. The jammer multipath is commonly referred to as "hot clutter".

Performance may also be enhanced by the inclusion of elevation DOF's in addition to azimuth DOF's.

Analyses, simulations and experiments have demonstrated that the performance achieved with partially adaptive STAP can approach that of a fully adaptive STAP processor.

Performance of STAP algorithms may be described by a plot of the SINR Loss over the space-time aperture. For an ideal monostatic radar, the SINR Loss will be characterized by a sharp linear null that is aligned with the clutter locus. The width of the null is a measure of MDV. The width of the null depends directly on the selection of radar DOF's, the STAP algorithm and signal processing parameters.

Differences in STAP algorithms are the result of the need to compensate for the more complex signal environment in a practical system that may include mismatch in receiver channels, roll, yaw and pitch of the radar platform, jammers, clutter motion and clutter inhomogeneities.

In bistatic radar systems, the vectors from the transmitter to a reference point, from the receiver to the same reference point and from the receiver to the transmitter define the sides of a triangle. The included angle at the reference point is called the bistatic angle. The bistatic angle measures the departure of a bistatic sensor from monostatic operation. For monostatic radar the bistatic angle is zero.

Bistatic radar operation may enable improved detection performance. Unlike the transmitter, the receiver does not have a large electromagnetic signature and so can be located closer to targets of interest. The reduction in range translates into increased signal-to-noise ratio (SNR) and the potential to detect small targets that might fall below the noise level for a radar receiver co-located with the illumination source (i.e., for monostatic operation).

Bistatic radar receiver operation may enable improved performance in the presence of countermeasures. Because bistatic receivers are passive, electronic countermeasure systems designed to determine the location of a receiver and direct jammer energy toward it are reduced in effectiveness. Similarly, radar cross-section reduction technology designed to re-direct scattered energy away from the transmitter are reduced in effectiveness.

Similarly, passive operation at reduced ranges may enable covert and clandestine deployment throughout an area of interest.

Multiple bistatic radar receivers can simultaneously exploit a single radar transmitter. This mode of operation is one example of multistatic operation and can be used to mitigate the effect of radar cross-section fluctuations and/or multipath fading and improves performance compared to monostatic radar.

The linearity of the clutter locus is retained in certain bistatic radar systems, those for which the transmitter is stationary. In such a system, there is no Doppler on the transmitter to clutter propagation path and the Doppler on the clutter-to-receiver propagation is just ½ of that for a monostatic radar system. In addition, the slope of the clutter locus is range independent. Because of the range independence, characteristics of clutter in a given range cell, i.e., R, the space-time covariance of clutter measurements, can be estimated based on data in neighboring range cells. The clutter suppression filter can then be derived in terms of the estimated clutter covariance.

FIG. 2 shows 4 delay strips for a typical airborne bistatic scenario and demonstrates that very basic relationships are simply lost in a bistatic system when the transmitter and receiver motion are unconstrained. For the scenario shown in FIG. 2, the transmitter is heading Northeast with a speed of 180 km and the receiver is approximately 140 km Southeast of the transmitter. Lost are linear and invariant relationships between space-time sensor measurements, specifically, the linear and delay invariant relationship between Doppler and sine of the azimuth angle, relationships that are the basis for clutter and interference suppression technology in monostatic systems.

Current bistatic and multistatic radar designs design and derive DOF's that are similar to those in a monostatic radar. Current approaches to bistatics and multistatics, for example, view the transmitter as an independent and essentially non-adaptive component of the larger system. Spatial degrees of freedom (DOF's) are allocated, in their entirety, to the receiver. While adaptive signal processing including STAP is commonly employed, the signal processing does not include transmitter feedback or adaptation of the transmitter aperture.

Because bistatic and multistatic clutter is highly non-linear and non-stationary, the direct application of STAP techniques developed for monostatic radar will have limited capability to suppress or cancel clutter while maintaining moving target detectability.

Approaches to bistatic and multistatic clutter suppression fall into two general categories: 1) clutter tuning and 2) measurement compensation.

Clutter tuning refers to attempts to eliminate or minimize the need for clutter suppression and STAP processing. Clutter tuning effectively restricts platform trajectories or restricts segment of platform trajectories for which data is processed in an effort to minimize the region of Doppler measurements containing clutter. For an ideal clutter tuning scenario, the transmitter and receiver platforms are at the same velocity and are moving toward a common point. In this case, the Doppler of clutter is exactly zero and the effects of clutter are highly localized in measurement space. The localization of clutter in measurement space is approximately obtained for transmitter and receiver platform motion that departs from the conditions for ideal clutter tuning. A practical system based on clutter tuning requires, in general, an increased number of platforms to ensure detection of all targets.

Measurement compensation techniques typically invoke physical models to define groups of similar scattering centers in neighboring delay to predict, for these scatterers, the dependence of the clutter locus on delay, Doppler and/or angle. The delay, Doppler and angle measurements of similar scattering centers define a map between neighboring measurement bins. This map can be used to identify and compensate measurements that are used to estimate the covariance of clutter or to otherwise characterize the statistical properties for techniques such as the Multistage Wiener Filters that do not require explicit computation of the covariance, define a map between delay bins that identifies and to compensate for variation in Doppler and angle measurements.

Measurement compensation techniques include derivative based updating (DBU), Doppler compensation and Doppler-angle compensation. Measurement compensation are designed for integration with STAP techniques developed for monostatic radar.

A single preferred combination of measurement compensation and STAP techniques has not been established. The special case of a bistatic radar with a stationary transmitter illustrates certain issues. The Characteristic Clutter Locus for a bistatic radar with a stationary transmitter shares the same linear and delay independent characteristics of the monostatic radar as shown in FIG. 1. However, when the strength of the radar return is also taken into account, it is known that the peak of the return will migrate along the linear clutter locus as the delay bin is varied. It has been shown even though the clutter locus is linear and delay invariant, the performance of JDL-GLR STAP algorithms will be significantly degraded unless the STAP algorithm is integrated with angle-Doppler compensation. In contrast, the it has been shown that Parametric Match Filters (PMF) can achieve effective clutter suppression without the integration of angle-Doppler compensation.

SUMMARY OF THE INVENTION

This invention provides the means to generate unique signals for spatially independent transmitter elements, for phase centers of distinct sub-arrays and for independent transmitter beams. The invention describes waveform codes that enable the signal at each receiver DOF to be filtered into a group of signals. The number of filtered signals is identical to the number of transmitter DOF's. Each filtered signal is uniquely associated with a transmitter DOF and a receiver DOF.

The invention describes a technique for formatting the filtered signals into a 2-dimensional array of elements called the Generalized Bistatic Aperture and assigning one of the filtered signals to an element in the Generalized Bistatic Aperture. The vertical position of the element in a Generalized Bistatic Aperture is defined by the index of the transmitter DOF. The horizontal position of the element is defined by the index of the receiver DOF.

The invention describes a technique to filter the signal at each element of the 2-dimensional Generalized Bistatic Aperture into a 1-dimensional array of signals. Each signal component in the 1-dimensional array is associated with multipath sources in a unique delay bin. After delay processing, the filtered signals are described by a 3-dimensional index that associates each filtered signal component with a unique transmitter DOF, receiver DOF and delay bin. An independent 3-dimensional array of filtered signals will be derived from data collected over an interval of time, called the dwell. The 3-dimensional index is extended to 4-dimensions by adding an index that identifies the dwell of the received data.

The 4-dimensional data arrays are called Fully Adaptive Data Quads.

The invention describes an alternate technique to filter the signal at each element of the 2-dimensional Generalized Bistatic Aperture into a 2-dimensional array of signals. Each signal component in the 2-dimensional array is associated with multipath sources in a unique delay-Doppler bin. After delay-Doppler processing, the filtered signals are described by a 4-dimensional index that associates each filtered signal component with a unique transmitter DOF, receiver DOF, delay bin and Doppler bin. An independent 4-dimensional array of filtered signals will be derived each CPI. The 4-dimensional index is extended to 5-dimensions by adding an index that identifies the CPI of the received data. For each Doppler index, the data spans a 4-dimensional sub-space that is similar in structure to the 4-dimensional data structure defined in the above paragraph.

The 4-dimensional index that is derived can also be extended to 5-dimensions by adding an index that identifies neighboring Doppler bins. For each Doppler index, the data spans a 4-dimensional sub-space.

The 4-dimensional data arrays are called Partially Adaptive Data Quads.

The Fully Adaptive and Partially Adaptive Data Quads can be factored into 2 orthogonal 2-dimensional sub-spaces. The first of the 2-dimensional sub-spaces spans the Generalized Bistatic Aperture. The second spans temporal measurements. The temporal measurements are delay-time for the Fully Adaptive Pre-processor and delay-time or delay-frequency for the Partially Adaptive Pre-processor.

The generalized bistatic clutter locus, defined as the locus of simultaneous Doppler-Transmitter Angle-Receiver Angle measurements in a selected delay bin. For an ideal bistatic radar that incorporates this invention, the generalized bistatic clutter locus is called the Characteristic Clutter Locus for DBA. The Characteristic Clutter Locus for DBA is constrained to a plane in the 3-dimensional measurement space. For an ideal bistatic radar that incorporates this invention the plane is independent of delay bin.

The invention describes techniques to reduce the size of the training data set for sensor data with a generalized bistatic clutter locus that is constrained to a plane. The first technique rotates and projects the 2-dimensional Generalized Bistatic Aperture subspace into a 1-dimensional linear array. The data at each element in the rotated and projected array is a linear combination of filtered signals. After rotation and projection, the 4-dimensional data arrays are transformed into 3 dimensional sub-arrays, called Generalized Bistatic STAP Datacubes, with 1 spatial and 2 temporal dimensions.

The invention describes a technique to interface the Generalized Bistatic STAP Datacubes to clutter suppression algorithms that have been developed for monostatic radar.

The invention describes an alternate technique based on Multistage Wiener Filters to simultaneously reduce the size of training data sets and suppress clutter.

In one embodiment of the invention, a transmitter for a bistatic radar system comprises a programmable waveform generator for creating an array of multiple independent waveforms and a plurality of RF sections for transmitting said independent waveforms, wherein each RF section translates the array of waveforms from IF to RF, amplifies the array of waveforms, and uses phase shifts and channel weighting to shape and steer a transmitter beam of the array of waveforms.

Another embedment of the invention comprises a method of filtering and processing a received radar signal comprising the steps of: receiving an element-level radar signal; splitting the element-level radar signal into a plurality of signal components, each signal component comprising energy scattered by a specific transmit element-receiver-element pair; forming a 2-D array of data associated with a plurality of transmitter and receiver degrees of freedom; rotating the 2-D array of data; re-sampling the array of data to find new degrees of freedom; and using a projection to eliminate residual degrees of freedom.

In yet another embodiment of the invention, a bistatic radar receiver sensor comprises a transmit aperture expansion on receive module; a bistatic aperture compression module; and a clutter mitigation module, wherein the transmit aperture expansion on receive module comprises: means for decomposing a received signal into signal component data associated with transmit-receive array element pairs; and means for organizing said signal component data into a two-dimensional array. The bistatic aperture compression module may comprise means for rotating the two-dimensional array.

Aspects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

The invention of the present application will now be described in more detail with reference to preferred embodiments of the architecture and method, given only by way of example, and with reference to the accompanying drawings, in which.

DESCRIPTION OF THE PREFERRED EMBODIMENTS

The present invention of distributed bistatic apertures builds on basic principles and reformulates the bistatic clutter suppression problem in a way that desirable features of monostatic operation, linearity and delay-independence, re-emerge. In particular, this new approach begins with the observation that the temporal clutter signature, the Doppler shift, is inherently distributed in space-time in the sense that it is depends on a combination of transmitter and receiver motion and position of the clutter patch relative to both the transmitter and receiver. This being the case, a simplified linear coupling with angle measurements will emerge only when the bistatic aperture is expanded to include transmitter degrees of freedom. When this is accomplished, the angle measurements, measurements of the spatial signature (i.e., sensor DOF's), are also distributed and more naturally matched to the observed Doppler effects.

Figure 1:
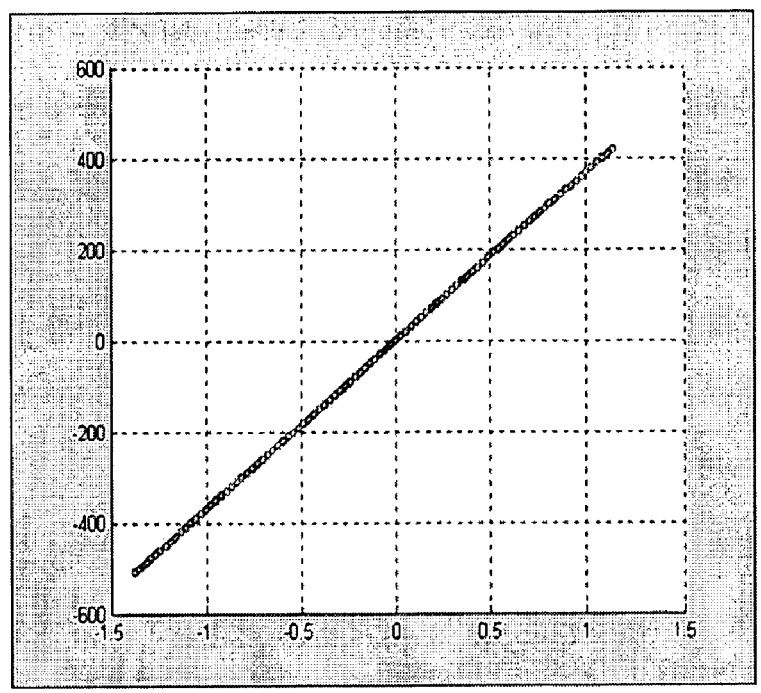
FIG. 1 illustrates the clutter measurements in a space-time aperture for a typical airborne monostatic radar system.
Figure 2:
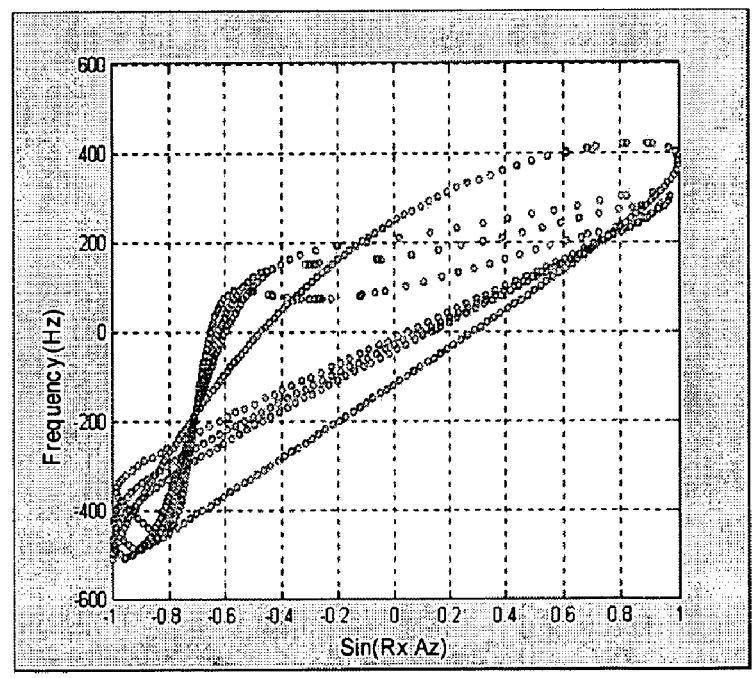
FIG. 2 illustrates 4 delay strips for a typical bistatic radar system in which the transmitter is moving.
Figure 3:
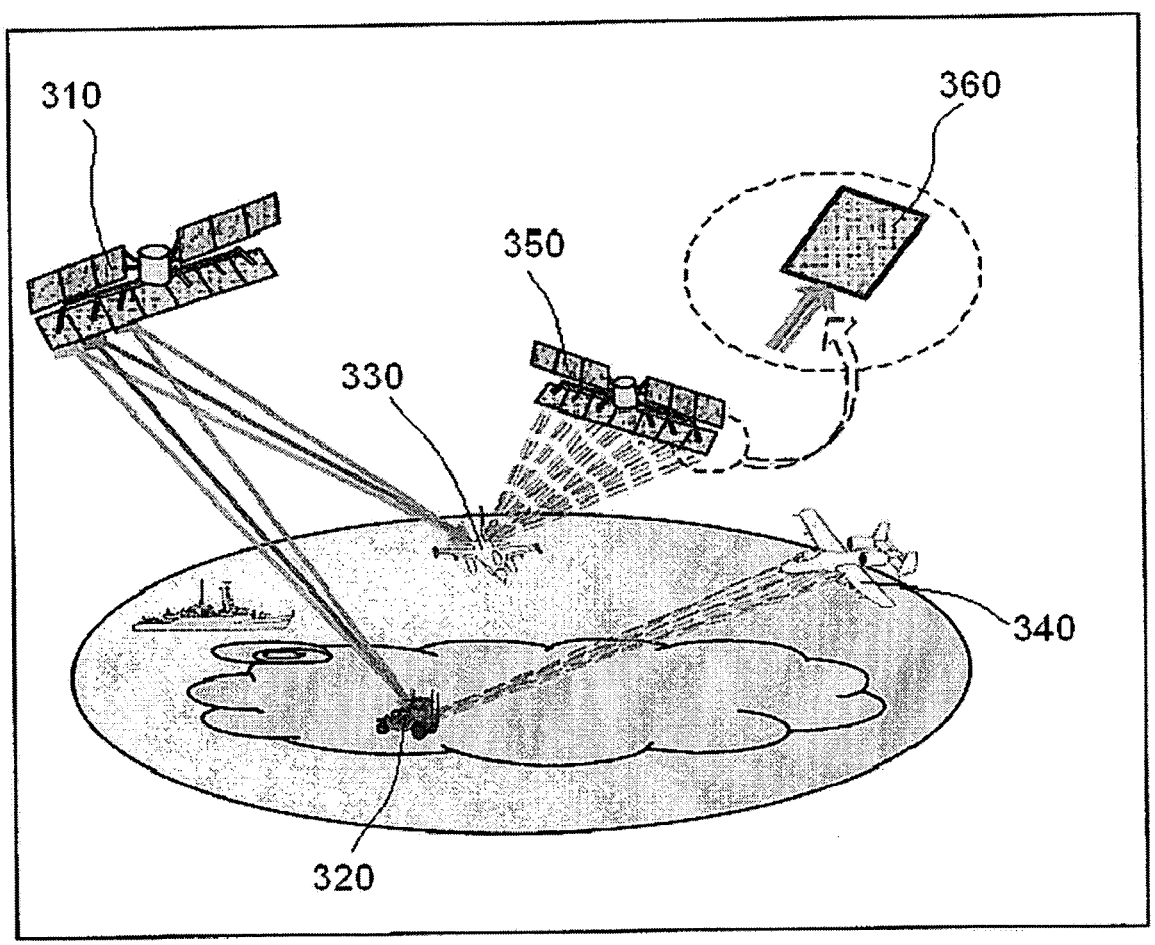
FIG. 3 is a diagram of a distributed bistatic aperture system in accordance with an embodiment of the present invention.

FIG. 3 depicts an example of an environment of an adaptive radar system for detecting and tracking a target in accordance with the present invention. A transmitter such as space borne transmitter 310 emits wideband electromagnetic energy transmissions in all directions. The transmitter 310 may include a plurality of elements and may be a phased array. Alternatively, the transmitter 310 may include a plurality of sub-arrays with spatially distinct phase centers. Alternatively, the transmitter 310 may include multiple beams with distinct beam centers. The signal may comprise orthogonal or pseudo-orthogonal signals.

Some of such transmitted signals are scattered by targets 320, 330. The scattered signals from target 330 may be received by space-borne receiver 350 or by airborne receiver 340 or by a ground receiver (not shown). At the receiver 350, the receiver element signal is decomposed into transmitter element components 360. The receivers 340 and 350 may comprise different components and may be an phased array of receiver elements or an array of sub-arrays or multiple beam antennas.

A distributed bistatic aperture ("DBA") creates spatial transmitter DOF's. Transmitter DOF's are formed as independent, spatially separated sub-arrays in the transmitter array or as simultaneous, independent beams. Unique waveforms are emitted through the phase center for each DOF.

The present invention introduces a new type of transmitter that incorporates a new approach to radar waveform design. The waveform design approach is built upon communications technology and provides for sharing of radar bandwidth among transmitter DOF's. These codes provide orthogonality or approximate orthogonality between channels in the presence of multipath (e.g., clutter).

The family of dual waveforms is replicated at the receiver and used to filter the signal at the output of each receiver element or sub-array. The filtering operation splits the element-level received signal into components. After filtering, the signal components contain the energy scattered by a specific transmit element-receive-element pair. A 2-D array of data associated with transmitter and receiver DOF's is then formed.

Figure 4:
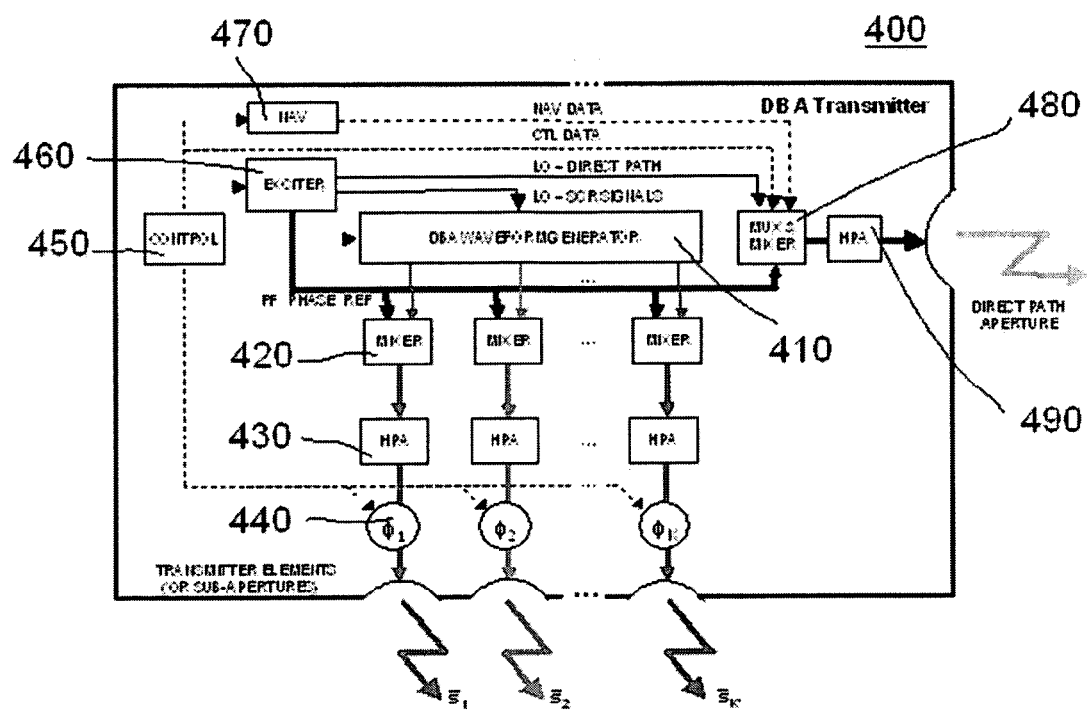
FIG. 4 is a block diagram of transmitter in accordance with an embodiment of the present invention.
Figure 5:
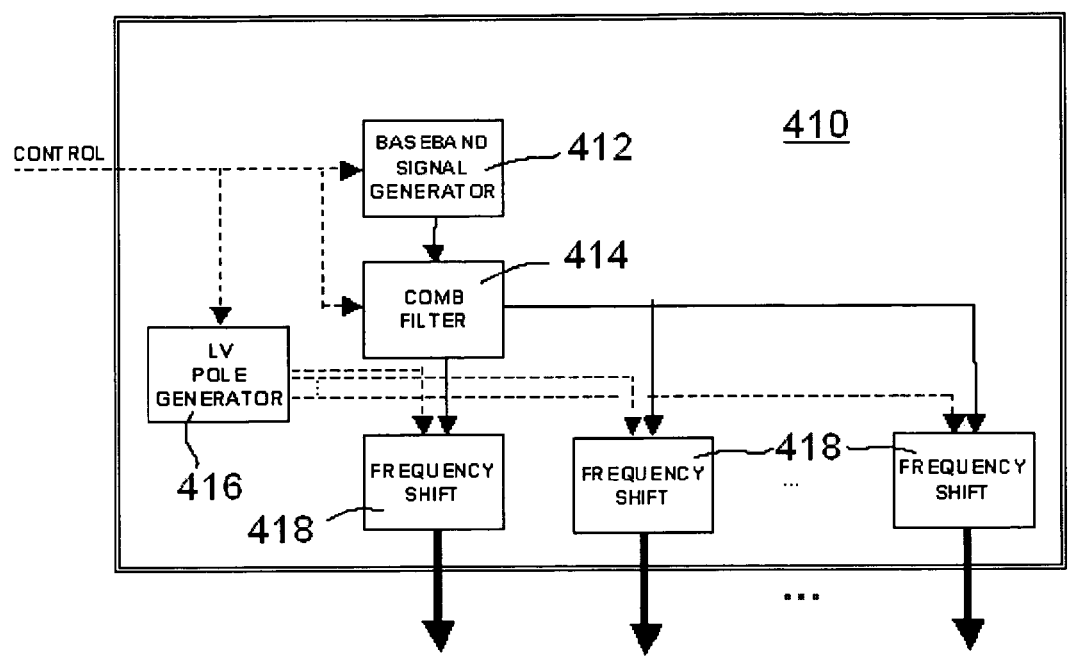
FIG. 5 is a functional block diagram of the waveform generator of a transmitter in accordance with an embodiment of the present invention.

FIG. 4 illustrates an embodiment of a DBA transmitter in accordance with the present invention. FIG. 5 shows the functional block diagram for an example waveform generator 410 called the Vandermonde-LaGrange (LV) Waveform Generator. At the core of the LV Waveform Generator 410 is the Baseband Signal Generator 412 that computes the time samples for what corresponds to a radar pulse. The waveform generator includes options for reference pulses based on impulse, Linear FM (LFM), and Pseudo-Noise (PN) modulation. Bandwidth, duration, duty factor and pulse shaping (e.g., uniform or Taylor weighting of the time series) are user specified parameters.

The output of the Baseband Signal Generator 412 is termed a reference pulse. A comb filter 414 is then applied to generate a reference waveform that retains the correlation properties of the reference pulse while reducing its spectral content. The comb filter 414 implementation simply generates a coherent repetition of the reference pulse. The spectrum of the pulse train is effectively zero, except at a set of equally spaced frequencies, and, at those frequencies, the spectrum of the pulse train is equal to that for the baseband waveform. The separation of spectral samples, $\Delta f$, is equal to the inverse of the inter-pulse interval, $\tau_p$, (or, for waveforms with a unity duty factor, the pulse duration). The width of the spectral samples is equal to the inverse of the duration of the reference waveform.

The coded LV waveforms are derived from the reference waveform (i.e., from the coherent pulse train). To accomplish this, for an N channel transmitter, the LV pole generator 416 divides the interval between spectral samples into N intervals. For this example waveform generator, the interval is divided into equally spaced intervals with separation $\Delta f_{ch}$. Typical values for $\Delta f_{ch}$ are on the order of 100's of Hz to 10's of kHz. Then, for each of the transmitter channels, a sub-carrier is generated at a multiple of $\Delta f_{ch}$. The N sub-carriers are then applied to replicas of the reference pulse train. By convention, these frequency shifts 418 are positive and the frequency shift is an up-conversion. The up-converted pulse train represents the LV waveform.

The waveforms for each of the transmitter channels overlap in the temporal domain and are interleaved in the spectral domain. This approach enables the use of continuous reference waveforms and transmitter signals with unity duty factor.

The frequency offset between channels is a fraction, $\Delta f_{ch}/B_{signal}$, of what would be required for conventional frequency division multiplexing (FDM). The LV codes are coherent or approximately coherent in the sense that transmitter angle information is preserved and the accuracy of transmitter angle measurements derived at the receiver for distributed sources increases as the ratio $\Delta f_{ch}/B_{signal}$ decreases. For FDM, this ratio is unity (or larger) and transmitter angle measurements are not accurately related to the bearing of distributed sources relative to the transmitter. In this sense, FDM signals do not maintain coherence in the presence of distributed multipath.

More generally, a family of reference pulses might be built on family of phase-coded pulses. Phase coding may be used to eliminate frequency channel offsets and thereby improve the code coherence. Further, the Pulse Repetition Frequency (PRF) for each pulse in this set may be varied.

The DBA transmitter shown in FIG. 4 locks all frequencies and timing signals to a common stable oscillator. The programmable DBA waveform generator 410 creates an array of multiple, independent waveforms that are then fed to identical RF sections, one for each transmitter phase center. The signal generator will also provide any required channel-to-channel amplitude weighting. The RF section translates the array of DBA waveforms from IF to RF at mixers 420 and provides power amplification 430. Programmable RF phase shifts 440 at each phase center, combined with channel-to-channel weighting can be used to shape and steer a nominal transmitter beam. In the default mode, when channel-to-channel waveforms are identical, the complex aperture weights control the transmitter sidelobe levels and beam direction.

FIG. 4 also shows an independent, "direct path" channel. This is included to ensure that any DBA receiver will, in general, have the capability to recover the reference phase of any transmitter that is to be exploited. The DBA receiver similarly may have a relatively low-gain reference aperture, aimed at the transmitter, with a signal processing chain designed to regenerate the reference RF phase.

Figure 6:
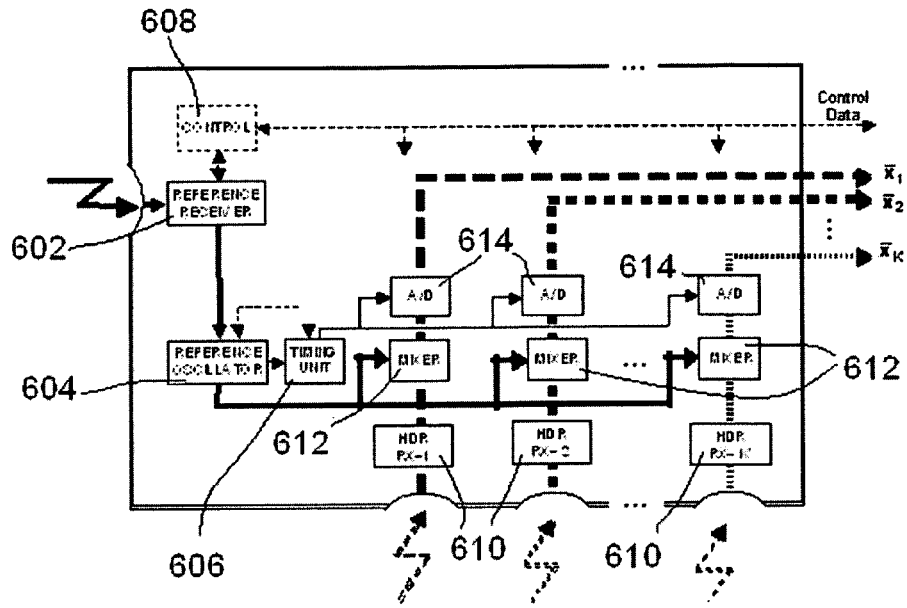
FIG. 6 shows a functional block diagram of a distributed bistatic aperture receiver in accordance with an embodiment of the present invention.

FIG. 6 shows the primary RF components of the DBA receiver. A reference receiver 602 receives the direct path signal and provides the signal to a controller 608 and a reference oscillator 604. The reference oscillator 604 provides its output to the timing unit 606 and a plurality of mixers 612. A plurality of high dynamic range receivers 610 receive the radar signals. The use of coherent high dynamic range receivers 610 is preferred because leakage of the transmitter signal through transmitter and receiver sidelobes will often be the dominant signal component and a source of receiver phase noise. The reference oscillator 604 and timing unit 606 are locked to the direct path signal received at reference receiver 602. Channel-to-channel coherency of received data streams can be accomplished by locking all local oscillators to the reference oscillator 604. FIG. 6 shows that this reference oscillator 604 is driven by the direct path signal. This provides coherency between transmitter and receiver channels.

The output of the receiver is an array of digitized data channels that correspond, on a one-to-one basis, with the spatial samples of scattered signals at the array of receiver phase centers.

Figure 7:
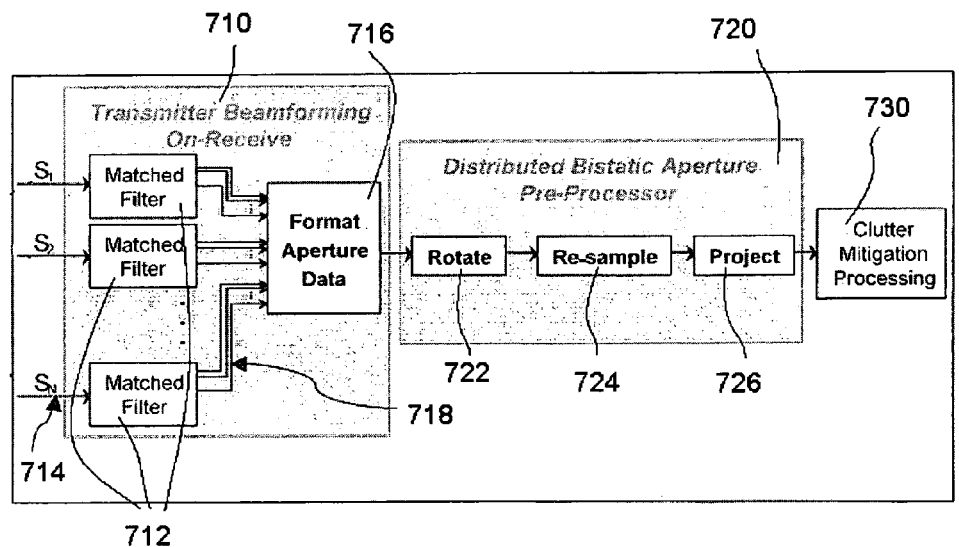
FIG. 7 illustrates a receiver sensor architecture for a distributed bistatic aperture system in accordance with an embodiment of the present invention.

FIG. 7 shows an embodiment of a receiver sensor processor for Distributed Bistatic Apertures. The block diagram shows three primary modules, Transmit Aperture eXpansion On-Receive (TAXO-R) 710, Bistatic Aperture Compression (BAC) 720 and Clutter Mitigation processing 730.

The TAXO-R module 710 implements the decomposition of the received signal into components associated with transmit-receive array element pairs. It is built on an array of matched filters 712, one signal 714 for each receiver element. Each of the element-level filters shown in FIG. 7 is itself an array of matched filters based on the array of coded transmitter signals. The filtering can be performed on a single pulse (delay-only filtering) or a group of pulses (delay-Doppler filtering). The signal 718 from the mth Transmit-nth Receive element pair is provided from the matched filters 712 to the Format Aperture Data module 716. The 'Format Aperture Data' module 716 organizes the signal component data into a 2-dimensional array of data channels, with the vertical axis used to specify transmitter array element number and the horizontal axis used to specify receiver array element number. The number of complex samples along the vertical axis is equal to the number of transmitter DOF's, $K_{tx}$. The number of complex samples along the horizontal axis is equal to the number of receiver DOF's, $K_{rx}$. The number of complex samples in the Generalized Bistatic Aperture is: $K_{TAXOR}=K_{tx} \times K_{rx}$ The result of the TAXO-R module 710 is an increase in sensor degrees of freedom from $K_{Rx}$ at 714 to $K_{TAXOR}$ at the output of 716 and 710.

The aperture response (also known as the impulse response and point spread function) describes the change in gain as a sample point is displaced from a reference point by the amount $\delta \bar{x}_p$. The transmitter [receiver] aperture response for this invention is denoted $H^{TX[RX]}$ and depends on:

a. the signal wavelength, $\lambda$, b. the signal bandwidth, $B_{signal}$, c. the channel offset, $\Delta f_{ch}$, d. the delay resolution, $\Delta_{res}$ e. the number of transmitter [receiver] phase centers: $K_{TX[RX]}$ f. the displacement between transmitter [receiver] phase centers: $\bar{d}_{TX[RX]}$ g. the direction vector between the transmitter [receiver] and the reference point: $\hat{e}_p^{TX[RX]}$ h. a cross-range vector that is orthogonal to the transmitter [receiver] direction vector: $\hat{u}_p^{TX[RX]}$ i. the distance from the transmitter [receiver] to the reference point: $\rho_p^{TX[RX]}$ For uniformly weighted apertures, the receiver aperture response is modeled as:

$$H^{[RX]} \equiv \text{sinc}\left(K_{RX}\left[\frac{(\delta \overline{x}_p \cdot \hat{u}_p^{RX})(\overline{d}_{RX} \cdot \hat{u}_p^{RX})}{\lambda_\mu \rho_p^{RX}}\right]\right).$$

For uniformly weighted apertures, the transmitter aperture response is modeled as:

$$H^{[TX]} \equiv \text{sinc}\left(K_{TX}\left[\begin{array}{c}\frac{(\delta \overline{x}_p \cdot \hat{u}_p^{TX})(\overline{d}_{TX} \cdot \hat{u}_p^{TX})}{\lambda_\mu \rho_p^{TX}} + \\ \left(\frac{\Delta f_{ch}}{B_{signal}}\right)\frac{\delta \overline{x}_p \cdot (\hat{e}_p^{TX} + \hat{e}_p^{RX})}{\lambda_{res}}\end{array}\right]\right).$$

This receiver aperture response shows that the receiver gain decreases as the cross-range displacement increases.

For the transmitter aperture response, the first argument in the sinc function is analogous to that for the receiver aperture response and describes gain for points near the beam center. The second term describes a focusing of the aperture response in the direction, $(\hat{e}_p^{TX}+\hat{e}_p^{RX})$, that is parallel to the gradient of the delay measurement. When $\Delta f_{ch} \square B_{signal}$, this term is negligible and the transmitter measurements are combined to form a transmitter beam. In this regard, when $\Delta f_{ch} \square B_{signal}$, the transmitter measurements and DOF's are coherent.

When $\Delta f_{ch} \square B_{signal}$, the transmitter DOF's are combined to effectively increase the signal bandwidth and improve delay measurement. As a result, when $\Delta f_{ch} \square B_{signal}$, the information associated with angle measurement relative to the transmitter cannot be derived and coherence is lost.

The Bistatic Aperture Compression (BAC) or Pre-processor module 720 follows the TAXO-R module 710. While the TAXO-R module 710 serves to expand the degrees of freedom and ensure that those required for linearity are included, the BAC module compresses or eliminates those degrees of freedom that are not required for clutter linearity. The BAC module, in combination with the TAXO-R module, serves as a clutter mitigation preprocessor, one designed to find and then minimize the degrees of freedom that govern clutter linearity.

The BAC module 720 first rotates DOF's for the TAXO-R array via coordinate rotating means 722 so that the new axes are aligned with the Doppler gradient. The array data is re-sampled at the re-sampler means 724 to ensure that it is aligned with the coordinate grid of the rotated coordinates.

After rotation and re-sampling, a projection module 726 is used to eliminate the residual degrees of freedom, i.e., those which are orthogonal to the Doppler gradient and are not needed for linearization. After rotation, re-sampling and projection, the clutter is linearized and the degrees of freedom are reduced.

Figure 8:
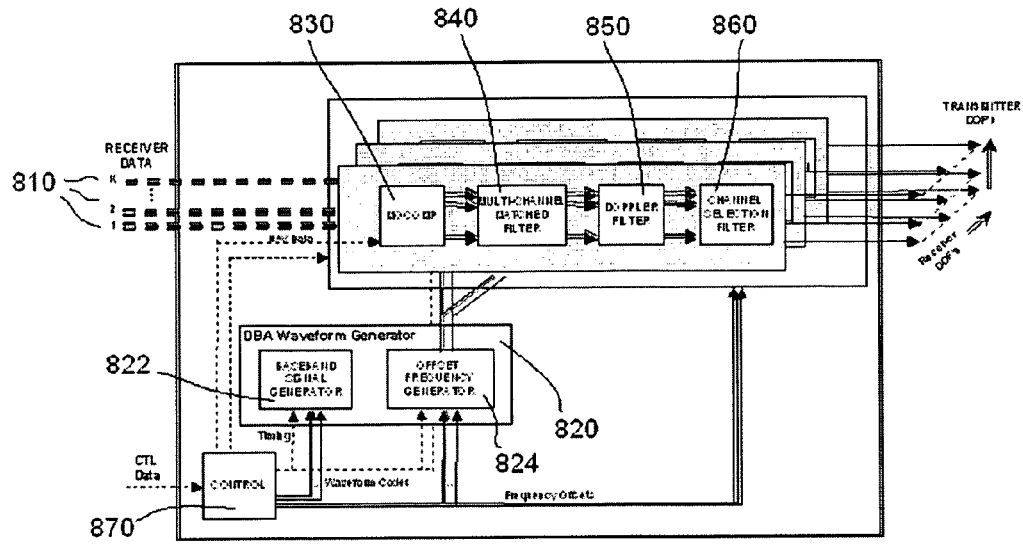
FIG. 8 illustrates a block diagram of a transmit aperture expansion on receive module for a distributed bistatic aperture system in accordance with an embodiment of the present invention.

FIG. 8 shows a more detailed functional block diagram for an embodiment of the TAXO-R signal processor or module of the present invention. The TAXO-R signal processor operates independently on each of the receiver data channels and is designed to de-multiplex the received signal into channels where each channel includes only a single LV waveform (from the $k^{th}$ transmitter channel) and all associated multipath components. The output of the TAXO-R signal processor is a set of ambiguity surfaces (a.k.a., CAF's or delay-Doppler surfaces), one for each slow-time DOF and each transmitter-receiver phase center pair.

The input signal for the $k^{th}$ receiver channel is a composite signal 810. That is, each of the coded transmitter signals, together with all the delay and Doppler shifted multipath components are combined at any selected receiver phase center. FIG. 8 shows use of the DBA Waveform Generator 820 having a baseband signal generator 822 and an offset frequency generator 824 to create replicas of the transmitted signal. Alternate configurations include generation of the reference waveform from the direct path signal. Motion Compensation (MOCOMP) module 830 applies motion compensation to the direct path signal to compensate for phase variations tied to platform motion and displacement of transmitter phase centers. MOCOMP module 830 is also used to remove from each receiver channel the overall phase variations due to sensor motion relative to a reference point called the scene center. The receiver channel is offset in frequency to compensate for offset of each selected transmitter channel. The compensated direct path and receiver signals are input to a CAF processor, implemented as a Matched Filter 840 cascaded with a Doppler Filter 850. A channel-selection filter 860 centered on zero-Doppler extracts the clutter response for the selected transmitter channel.

For certain bistatic radar scenarios, the delay of multipath source at scene center, $\tau_{sc}$ may be larger than the PRI. For these scenarios, the channel selection filter 860 applies a linear phase shift, $\Delta\phi_k$ across each group of transmitter DOF's. The order of the ambiguity, $N_{amb}$ is defined as $$N_{amb} = \text{floor}\left(\frac{\tau_{SC}}{PRI}\right)$$

The linear phase shift applied at 860 to a group of transmitter DOF's (indexed by k) in the channel selection filter 860 is $\Delta\phi_k=2\pi(k-1)\Delta f_{ch}N_{amb}\text{PRI}$. TAXO-R data at output of 860 is a set of $K_{TAXOR}$ vector samples, $\overline{IQ}$, for each delay-Doppler measurement cell.

Figure 9:
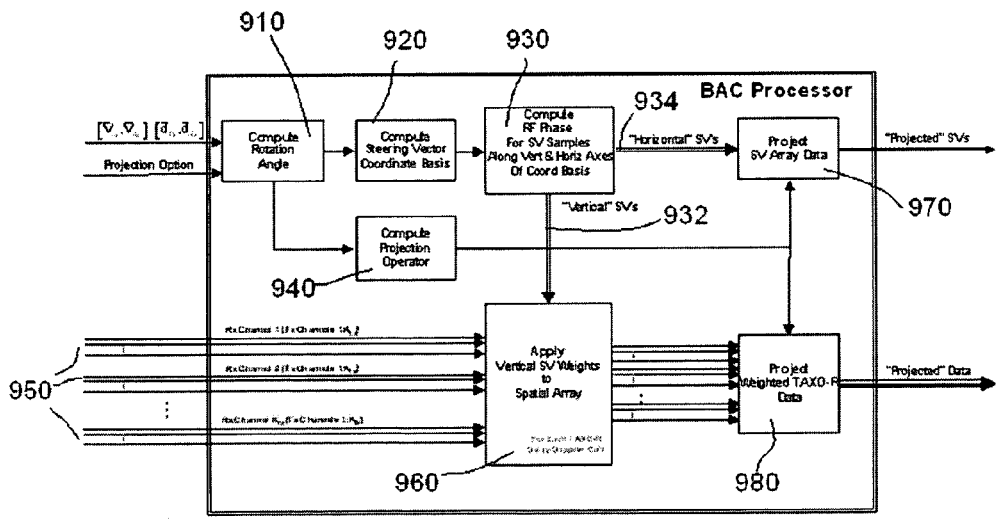
FIG. 9 illustrates a functional block diagram of a bistatic aperture compression module in accordance with an embodiment of the present invention.

FIG. 9 shows a functional block diagram of an embodiment of a Bistatic Aperture Compression (BAC) module in accordance with the present invention. BAC is a process designed to isolate DOF's associated with clutter linearity and then to compress the dimensionality of TAXO-R data, removing those DOF's that are not tied to clutter linearity. A by-product of BAC processing is a set of steering vectors for Clutter Mitigation Processing.

The BAC module computes a rotation angle at 910 that is used to mix transmitter and receiver DOF's. The rotation angle is defined in terms of the speed of the transmitter, $|V_{Tx}|$, the speed of the receiver, $|V_{Rx}|$, the spatial separation of transmitter DOF's, $d_{TX}$ and the spatial separation of the receiver DOF's, $d_{Rx}$. A specific form for the desired rotation angle is as follows:

$$\phi_{DBA} = \tan^{-1}\left(\frac{|V_{TX}|}{|V_{RX}|} \cdot \frac{d_{RX}}{d_{TX}}\right)$$

The rotation angle, $\Phi_{DBA}$, is used to compute a coordinate grid for spatial steering vectors at 920. The computation begins with an initial 2-dimensional coordinate grid, GRID-$SV_{\phi=0}$, where the x-dimension corresponds to the sine of the receiver azimuth angle measurements, $\sin(\theta_{Rx})$ and the y-dimension corresponds to samples of the sine of the transmitter azimuth angle measurements, $\sin(\theta_{Tx})$. The initial grid is rotated though the angle, $\Phi_{DBA}$. The axes for the rotated grid, GRID-SV$_{\phi=\Phi_{DBA}}$, are denoted x' and y'. Each value on the x' axis defines a unique pair of transmitter and receiver measurements:

$$[\sin(\theta_{Rx}), \sin(\theta_{Tx})]$$

The pair of transmitter and receiver measurements define a pair of transmitter and receiver steering vectors $\overline{SV}_{Tx}$ and $\overline{SV}_{Rx}$. The steering vector for the selected point on the x' axis is computed at 930 as the product of the transmitter and receiver steering vectors. The set of steering vectors defined by samples along the x'-axis are called "horizontal steering vectors" 932. In a similar manner steering vectors are computed at 930 for samples along the y'-axis. The set of steering vectors defined by samples along the y'-axis are called "vertical steering vectors" 934. Horizontal steering vectors 934 are denoted: $\overline{SV}_{horiz}$. Vertical steering vectors 932 are denoted: $\overline{SV}_{vert}$. A general steering vector can be derived as a product of vertical and horizontal steering vectors.

$$\overline{SV} = \overline{SV}_{horiz} \cdot \overline{SV}_{vert}$$

The rotation angle is used to compute a projection operator, $\Pi$, at 940. The computation of the projection operator begins with the definition of a 2-dimensional coordinate grid for the Generalized Bistatic Aperture. The coordinates correspond to indices assigned to the transmitter and receiver DOF's. Receiver coordinates are aligned with the x-axis and transmitter coordinates are aligned with the y-axis. A rotation through the angle $\Phi_{DBA}$ as defined above is applied to the Generalized Bistatic Aperture coordinates. After the rotation, data values will, in general, not be associated with integer values of the rotated coordinates. Interpolation is used to map data values for the Generalized Bistatic Aperture into a new set of values defined at integer values of the rotated coordinates. This process re-samples the Generalized Bistatic Aperture and is analogous to polar-to-rectangular re-sampling that has been developed for spotlight Synthetic Aperture Radar (SAR). The projection operator, $\Pi$, is computed as an operator that sums values defined on the Generalized Bistatic Aperture along the y-axis.

TAXO-R data for each delay-Doppler measurement cell is a set of vector samples, $\overline{IQ}$, at 950.

This projection operator acts on both horizontal steering vectors 970 and on weighted TAXO-R data 960 at 980. The projection operator is used to deterministically reduce the dimensionality of both TAXO-R data and "horizontal" steering vectors.

The projected steering vector computed at 970 depends on the projection operator and the horizontal steering vector:

$$\Pi \overline{SV} = \Pi[\overline{SV}_{horiz}]$$

The weighted TAXO-R data at 960 is the element-by-element product of vertical steering vectors and TAXO-R vector samples: $\overline{SV}_{vert} \cdot \overline{IQ}$ The projected data is computed at 980 as the projection of weighted TAXO-R data:

$$\Pi \overline{X} = \Pi[\overline{SV}_{vert} \cdot \overline{IQ}]$$

An alternate mode of operation that can be realized with this embodiment is called Standard Bistatics with DBA Channel Sharing. For Standard Bistatics with DBA Channel Sharing, the rotation angle computed at 910 is set to zero. In this case, there is a simple one-to-one correspondence between transmitter and vertical steering vectors and another simple one-to-one correspondence between receiver and horizontal steering vectors.

For this alternate mode, Standard Bistatics with DBA Channel Sharing, horizontal and vertical steering vectors can be computed. For this alternate mode, FIGS. 10*a–b* and FIGS. 11*a–b* show the characteristics of example horizontal and vertical steering vectors.

Figure 10A:
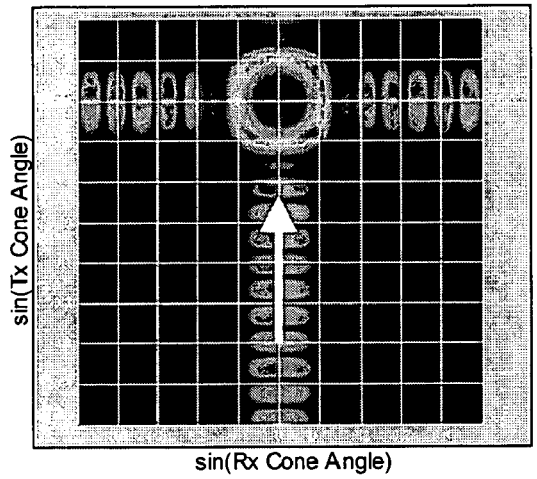
FIG. 10a shows a coordinate system for steering vectors an impulse response for a vertical or transmitter steering vector displaced along the transmitter axis in accordance with an embodiment of the present invention.
Figure 11A:
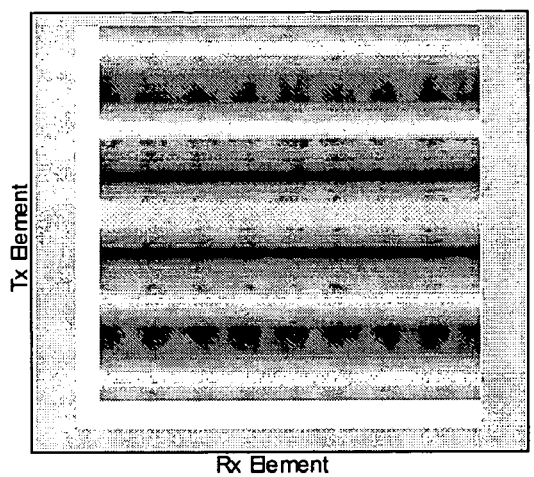
FIG. 11a shows the phase response of a steering vector over the $K_{tx} \times K_{rx}$, phase centers in a Generalized Bistatic Aperture.

FIG. 10*a* shows the impulse response (IPR) for an example vertical or transmitter steering vector displaced along the transmitter axis. The IPR is computed as the vector dot produced between the example steering vector and all steering vectors. The IPR is computed over the coordinate grid, GRID-SV$_{\phi=0}$, defined according to [000124]. FIG. 11*a* shows the phase response of the example steering vector over the $K_{tx} \times K_{rx}$ DOF's in the Generalized Bistatic Aperture.

Figure 10B:
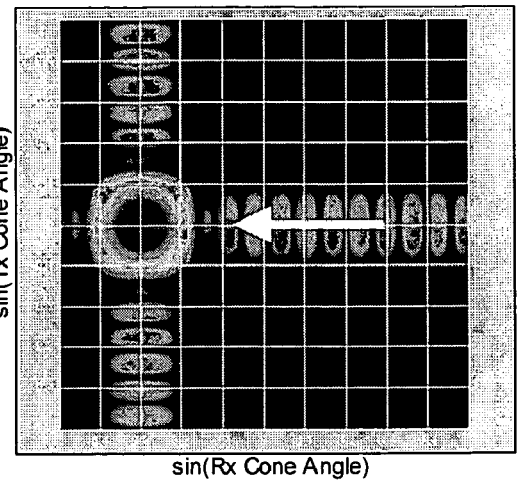
FIG. 10b shows an impulse response for a horizontal steering vector sample.
Figure 11B:
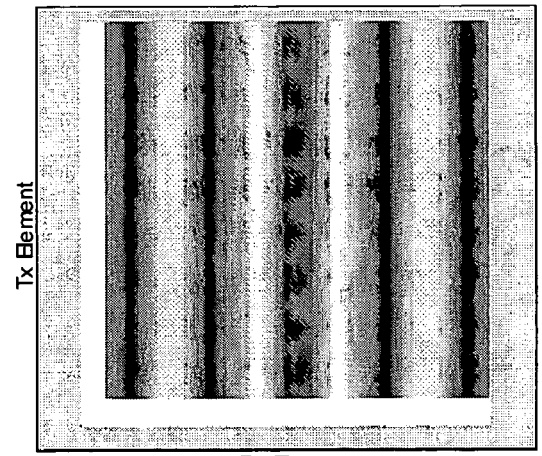
FIG. 11b shows a phase response corresponding to FIG. 11 over a Generalized Bistatic Aperture.

FIG. 10*b* shows the IPR for a horizontal steering vector sample and FIG. 11*b* shows the corresponding phase response over the Generalized Bistatic Aperture.

For the primary mode of operation employed by DBA, FIGS. 12*a–b* and FIGS. 13*a–b* show the characteristics of example horizontal and vertical steering vectors. For this example, the transmitter and receiver speeds are the same. The displacements of transmitter and receiver DOF's are also the same.

Figure 12A:
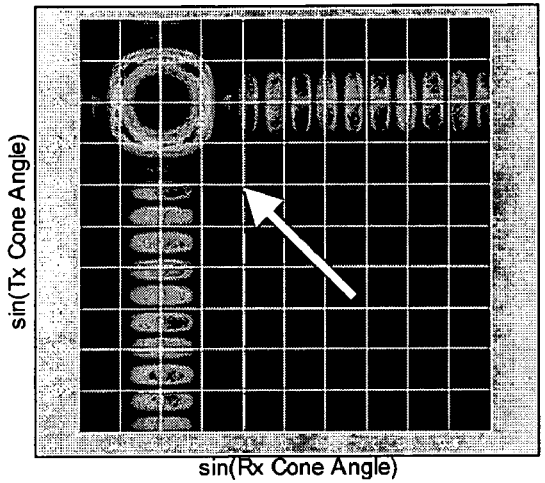
FIGS. 12a–b show the displacement of steering vector samples along each of the two independent axes.
Figure 12B:
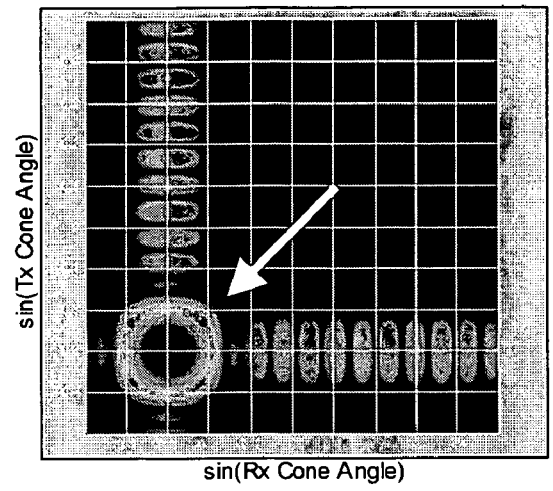

FIGS. 12*a–b* show the displacement of the IPR for example vertical and horizontal steering vectors over the coordinate grid, GRID-SV$_{\phi=0}$, defined according to [000128].

Figure 13A:
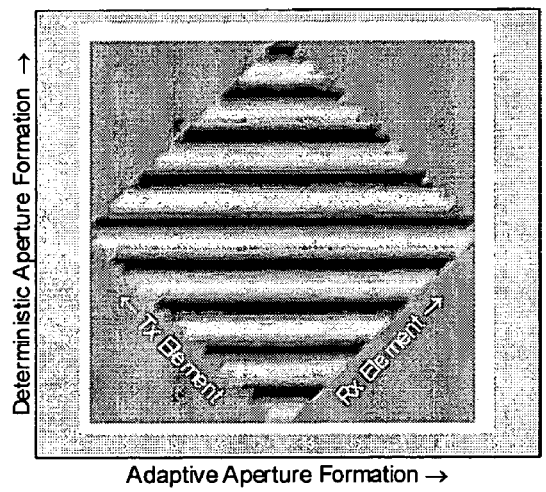
FIGS. 13a–b show the phase response associated with each of the two steering vector samples of FIGS. 12a–b.
Figure 13B:
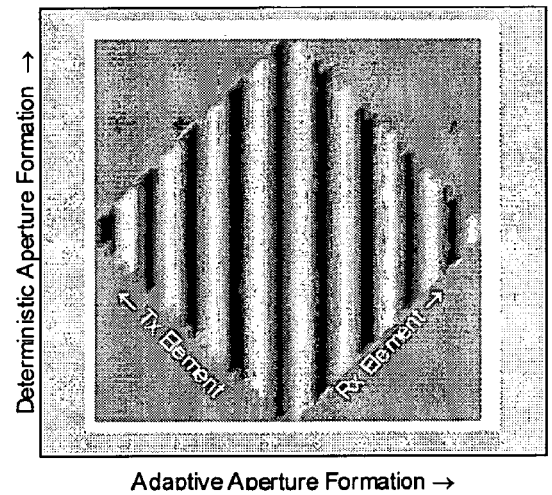

FIGS. 13*a–b* show the phase response associated with each of the two steering vector samples over the Generalized Bistatic Aperture.

The phase variation for the vertical steering vector in FIG. 13*a* is entirely along the vertical axis. Similarly, the phase variation for the horizontal steering vector in FIG. 13*b* is entirely along the horizontal axis Because the phase for horizontal steering vectors is constant along the DOF's that are removed by the projection operator, application of the projection operator to data weighted by a general steering vector can be decomposed to projection of data weighted by a vertical steering vector followed by weighting by a projected steering vector:

$$\Pi[\overline{SV}_{horiz} \cdot \overline{SV}_{vert} \cdot \overline{IQ}] = \Pi[\overline{SV}_{horiz}] \cdot \Pi[\overline{SV}_{vert} \cdot \overline{IQ}]$$

This establishes that the BAC Processor outputs, $\Pi[\overline{SV}_{horiz}]$ and $\Pi[\overline{SV}_{vert} \cdot \overline{IQ}]$, provide a complete representation of the DBA data and steering vectors. The BAC Processor outputs are passed to the Clutter Mitigation Processor (CMP) where the projected data, $\Pi[\overline{SV}_{vert} \cdot \overline{IQ}]$, is adapted to projected steering vector, $\Pi[\overline{SV}_{horiz}]$.

A general steering vector can be formed as a product of vertical and horizontal steering vectors. And, again in a similar manner, application of the projection operator to data weighted by a general steering vector can be factored into a product $\Pi[\overline{SV}_{horiz}] \cdot \Pi[\overline{SV}_{vert} \cdot \overline{IQ}]$. The factor on the right is processed deterministically to reduce the DOF's that are to be processed adaptively.

Steering vectors are defined in terms of the gradient of the phase with respect to the spatial and temporal DOF indices $(k_x, k_y, n)$. The general steering vector for clutter consists of a 2-D vector that represents the spatial components and a temporal component (a scalar):

$$\overline{SV} \equiv \begin{pmatrix} \frac{d_{rx}}{\lambda}\cos(\beta)\sin(\theta_{rx}) + \frac{d_{tx}}{\lambda}\sin(\beta)\sin(\theta_{tx}) \\ -\frac{d_{rx}}{\lambda}\sin(\beta)\sin(\theta_{rx}) + \frac{d_{tx}}{\lambda}\cos(\beta)\sin(\theta_{tx}) \end{pmatrix}$$

$$SV_t \equiv \frac{V_{rx}\delta t}{\lambda}\sin(\theta_{rx}) + \frac{V_{tx}\delta t}{\lambda}\sin(\theta_{tx})$$

The 3 dimensional space-time steering vector is:

$$\overline{SV}_{3d} \equiv \begin{pmatrix} \overline{SV} \\ SV_t \end{pmatrix} = \begin{pmatrix} SV_x \\ SV_y \\ SV_t \end{pmatrix}$$

The general, rotated spatial steering vector, $\overline{SV}$, is:

$$\overline{SV} \equiv \begin{pmatrix} \frac{d_{rx}}{\lambda}\cos(\beta)\sin(\theta_{rx}) + \frac{d_{tx}}{\lambda}\sin(\beta)\sin(\theta_{tx}) \\ -\frac{d_{rx}}{\lambda}\sin(\beta)\sin(\theta_{rx}) + \frac{d_{tx}}{\lambda}\cos(\beta)\sin(\theta_{tx}) \end{pmatrix}$$

In order to find appropriate transformations so that the set of steering vectors for clutter are linear in the x-t plane (i.e., the projection of state vectors is a line in the x-t plane), the spatial steering vectors are decomposed into bistatic clutter position vectors, $\overline{X}$, bistatic sensor state vectors $\overline{\delta}_x$, $\overline{\delta}_y$, and $\overline{v}$ (i.e., displacement and velocity vectors) and rotation operators, $M_z(\beta)$.

$$\overline{SV} = \begin{pmatrix} \cos(\beta) & \sin(\beta) \\ -\sin(\beta) & \cos(\beta) \end{pmatrix} \begin{pmatrix} \frac{d_{rx}}{\lambda} & 0 \\ 0 & \frac{d_{tx}}{\lambda} \end{pmatrix} \begin{pmatrix} \sin(\theta_{rx}) \\ \sin(\theta_{tx}) \end{pmatrix} \text{ where}$$

The bistatic clutter position vector is:

$$\overline{X} = \begin{pmatrix} \sin(\theta_{rx}) \\ \sin(\theta_{tx}) \end{pmatrix}.$$

The bistatic sensor state vectors are:

$$\overline{\delta}_x = \begin{pmatrix} \frac{d_{rx}}{\lambda} \\ 0 \end{pmatrix}, \overline{\delta}_y = \begin{pmatrix} 0 \\ \frac{d_{tx}}{\lambda} \end{pmatrix} \text{ and } \overline{v} = \begin{pmatrix} \frac{V_{rx}\delta t}{\lambda} \\ \frac{V_{tx}\delta t}{\lambda} \end{pmatrix}.$$

The rotation operators are:

$$M_z(\beta) = \begin{pmatrix} \cos(\beta) & \sin(\beta) \\ -\sin(\beta) & \cos(\beta) \end{pmatrix}.$$

In more compact form, we can write:

$$SV_t = \overline{v}^T \cdot \overline{X}$$

$$SV_x = [M_z(\beta) \cdot \overline{\delta}_x]^T \cdot \overline{X}$$

$$SV_y = [M_z(\beta) \cdot \overline{\delta}_y]^T \cdot \overline{X}$$

We now choose the space-time rotation angle, $\beta_{\delta v}$, to ensure alignment of the normalized displacement and velocity vectors:

$$M_z(\beta) \cdot \overline{\delta}_x = \alpha \overline{v}$$

Equivalently, we require:

$$\begin{pmatrix} \cos(\beta) \\ -\sin(\beta) \end{pmatrix} d_{rx} = \alpha \begin{pmatrix} V_{rx} \\ V_{tx} \end{pmatrix} T_{pri}$$

The solution is found as follows:

$$\alpha = \frac{d_{rx}}{\sqrt{V_{rx}^2 + V_{tx}^2} \cdot T_{pri}}$$

$$\beta_{\delta v} = \tan_2^{-1}(V_{tx}, V_{rx})$$

The transformed space-time state vector is given by:

$$SV_t = \overline{v}^T \cdot \overline{X}$$

$$SV_x = \frac{d_{rx}}{\sqrt{V_{rx}^2 + V_{tx}^2} \cdot T_{pri}} (\overline{v}^T \cdot \overline{X})$$

$$= \frac{d_{rx}}{\sqrt{V_{rx}^2 + V_{tx}^2} \cdot T_{pri}} SV_t$$

$$SV_y = [M_z(\beta) \cdot \overline{\delta}_y]^T \cdot \overline{X}$$

$$= \frac{d_{tx}}{\lambda} [\sin(\beta_{\delta v})\cos(\beta_{\delta v})]^T \cdot \overline{X}$$

This establishes that the clutter state vectors are constrained to lie in a plane. The normal to the plane is:

$$\hat{n} = \sqrt{\frac{(V_{rx}^2 + V_{tx}^2) \cdot T_{pri}^2}{(V_{rx}^2 + V_{tx}^2) \cdot T_{pri}^2 + d_{rx}^2}} \left\{ \frac{d_{rx}}{\sqrt{V_{rx}^2 + V_{tx}^2} \cdot T_{pri}} \hat{e}_t - \hat{e}_x \right\}.$$

The 2-dimensional plane of clutter state vectors is spanned by a space-time vector, $\hat{\omega}_{st}$, and a purely spatial vector, $\hat{\omega}_{sp}$, where:

$$\hat{\omega}_{st} = \sqrt{\frac{(V_{rx}^2 + V_{tx}^2) \cdot T_{pri}^2}{(V_{rx}^2 + V_{tx}^2) \cdot T_{pri}^2 + d_{rx}^2}} \left( \hat{e}_t + \frac{d_{rx}}{\sqrt{V_{rx}^2 + V_{tx}^2} \cdot T_{pri}} \hat{e}_x \right) \text{ and}$$

$$\hat{\omega}_{sp} = \hat{e}_y$$

The projection operator, $\Pi = \tilde{I} - \omega_{sp}\omega_{sp}$ transforms the clutter locus from a plane (or set of parallel planes) in a 3-dimensional into a line (or set of planes lines) in a 2-dimensional space. The projection operator is computed as a function of the identity operator, $\tilde{I}$, and spatial basis vector for the plane of clutter state vectors, $\hat{\omega}_{sp}$. denotes the outer product. After projection, clutter measurements are constrained to a 1-dimensional sub-space. The space-time vector, $\hat{\omega}_{st}$, provides a basis for this 1-dimensional sub-space of clutter state vectors.

This explicitly demonstrates the desired linearity of transformed clutter state vectors.

Before projection, the clutter locus for clutter samples with a common delay measurement are a subset of the 2-dimensional plane. The space-time vector, $\hat{\omega}_{st}$, describes the 1-dimensional clutter locus after projection. This explicitly demonstrates that the linearity of the clutter state vectors after projection is delay-independent. The delay independence ensures that statistical characterization of clutter properties based on data in neighboring delay strips will approximate the statistical behaviour on any delay strip selected for clutter suppression and target detection. In this manner, desireable features of monostatic radar operation on moving platforms in a clutter environment are realized by this invention.

The clutter state vectors characterize the clutter covariance and the linearity of the projected clutter state vectors ensure that the clutter covariance is reduced rank. The delay independence of the clutter state vectors ensure that sample matrix techniques accurately estimate the reduced rank clutter covariance.

For ambiguous measurements, the temporal component of the clutter state vector, $SV_t$, is modified by the addition of a constant term. This leads to an additional plane of clutter measurements that is parallel to the primary plane of measurements. In general, clutter state vectors will span a set of parallel planes.

Figure 14:
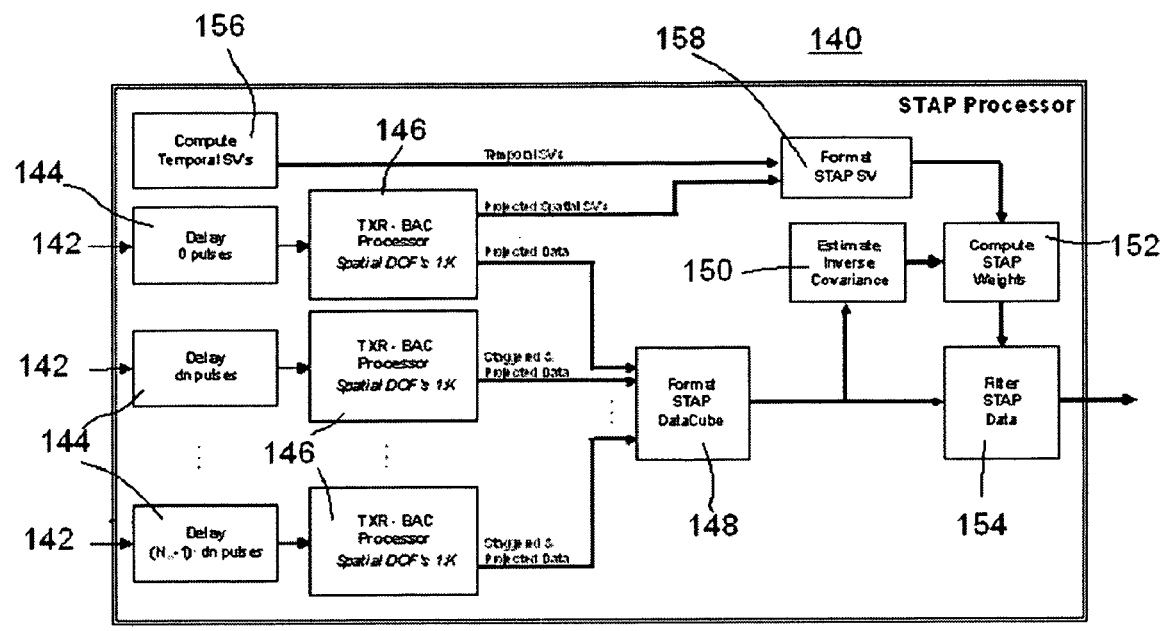
FIG. 14 is a block diagram of a clutter mitigation system in accordance with an embodiment of the present invention.

FIG. 14 shows a block diagram for an example Clutter Mitigation Processor (CMP) 140 that may be integrated with the DBA Pre-processor (TAXO-R+BAC). FIG. 14 shows an input of N data channels 142 (each consisting of $K_{rx}$ receiver channels) with each succeeding channel delayed by an additional dn pulses 144. The architecture is designed to support a technique called Staggered PRF, a specific form of Post-Doppler STAP.

The Format STAP DataCube 148 block populates a 3-dimensional data array with data that represents spatial DOF's (projected data at the output of the BAC processor) 146, slow-time DOF's (derived from the staggered data streams) and fast-time DOF's (derived from neighboring delay strips). The formatting process for data and for SV's re-organizes the multi-dimensional array into a single vector.

The DataCubes, $\overline{X}(m,n)$, are parameterized by delay and Doppler indices, m and n. The Estimate Inverse Covariance block 150 computes the covariance of each DataCube:

$$\tilde{R}(m,n) = \overline{X}(m,n) \cdot \overline{X}(m,n)^T$$

An estimate of the covariance at a delay-Doppler sample (with indices $m_0$ and $n_0$) is computed as an average of $\tilde{R}(m,n_0)$ over neighboring delay bins:

$$\tilde{R}_{est}(m_0, n_0) = \frac{1}{2N_R} \sum_{\substack{m=m_0-N_R \\ m \neq m_0}}^{m_0+N_R} \tilde{R}(m, n_0)$$

The number of samples used to compute the estimated covariance is $N_R$ which is chosen to be on the order of the number of DOF's (i.e., the length of the vector $\overline{X}$).

For each delay-Doppler sample, the eigenvectors, $\overline{u}_q(m_0,n_0)$, and eigenvalues $\lambda_q(m_0,n_0)$ of $\tilde{R}_{est}(m_0,n_0)$ are computed.

The principal components estimate of the inverse covariance begins with an exact expression for the inverse:

$$R_{est}(m_0, n_0)^{-1} = \frac{1}{\lambda_{min}} \left( \tilde{I} - \sum_{q=1}^{N} \left( \frac{\lambda_q(m_0, n_0) - \lambda_{min}}{\lambda_q(m_0, n_0)} \right) \overline{u}_q(m_0, n_0) \overline{u}_q(m_0, n_0)' \right)$$

The minimum eigenvalue, $\lambda_{min}$, will typically be set by noise and the principal components technique restricts the summation to those eigenvalues that exceed the minimum eigenvalue by a pre-set threshold.

The Compute STAP Weights block 152 applies the estimated inverse covariance to the projected steering vector:

$$\overline{W}_{proj}(m_0,n_0) = \tilde{R}_{est}(m_0,n_0)^{-1} \overline{SV}_{proj}$$

The Filter STAP Data block 154 applies the weights to the STAP DataCube:

$$\overline{Y}(m_0,n_0) = \overline{W}_{proj}(m_0,n_0)' \cdot \overline{X}(m_0,n_0)$$

Figure 15A:
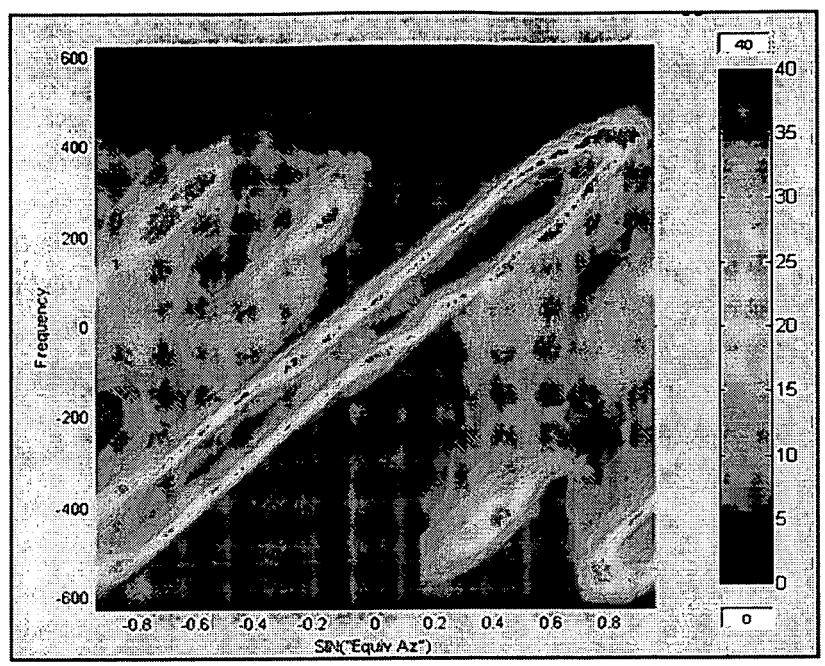
FIGS. 15a–b show the results of example simulations that demonstrate performance capabilities that are obtained with this invention.

The Clutter Mitigation Processor shown in FIG. 14 and integrated with the embodiment of BAC shown in FIG. 9 comprises a two-stage DBA clutter processor. The DBA clutter processor operates on Data Quads and is called Projected Bistatic STAP. FIG. 15a shows the SINR Loss over the space-time aperture for the same example airborne bistatic radar simulation. The offset of logarithmic scale in FIG. 15a has been set arbitrarily to coincide with FIG. 15b. The minimum value corresponds to a SINR Loss of −40 dB. The region of high SINR Loss and a high value of clutter suppression is called the clutter null and coincides with the linear clutter locus for that scenario. Regions in the space-time aperture away from the clutter null show a lower level of signal suppression that approaches the value of the scale which corresponds to a SINR Loss that is near 0. Targets with angle-Doppler measurements in this region of the space-time aperture will be attenuated by an amount that is measurably less than the attenuation of clutter. In this regard, this invention is said to linearize and localize the clutter null and to minimize the MDV.

DBA technology can be integrated with a broad classes of adaptive and non-adaptive clutter mitigation techniques including STAP with or without derivative-based updating and with or without Doppler-angle compensation. The current embodiment represents one example.

The current embodiment of Projected Bistatic STAP operates on 3-dimensional subspaces of the Data Quads. The 3-dimensional subspaces are defined by transmitter DOF's, receiver DOF's and temporal DOF's. The first stage of the current embodiment uses non-adaptive processing to exploit the reduced clutter rank and to reduce the subspace from 3-dimensions to 2-dimensions. The second stage applies adaptive processing to the residual 2-dimensional sub-space. An alternate implementation combines BAC and clutter mitigation processing into a single stage algorithm that applies adaptive processing to the full 3-dimensional sub-space. MWF provides an example algorithm that operates directly on data in the Generalized Bistatic Aperture and integrates the clutter rank reduction realized separately by BAC and CMP for the current embodiment.

An alternate embodiment is called Electronic Clutter Tuning. Electronic Clutter Tuning replaces the adaptive CMP with a non-adaptive processor. The non-adaptive processor is comprised by the direct, non-adaptive application of generalized steering vectors to the output of the BAC processor. Electronic Clutter Tuning, is designed to reduce the dimensionality of the clutter and expand the volume of measurement space that can be used for target detection.

Figure 15B:
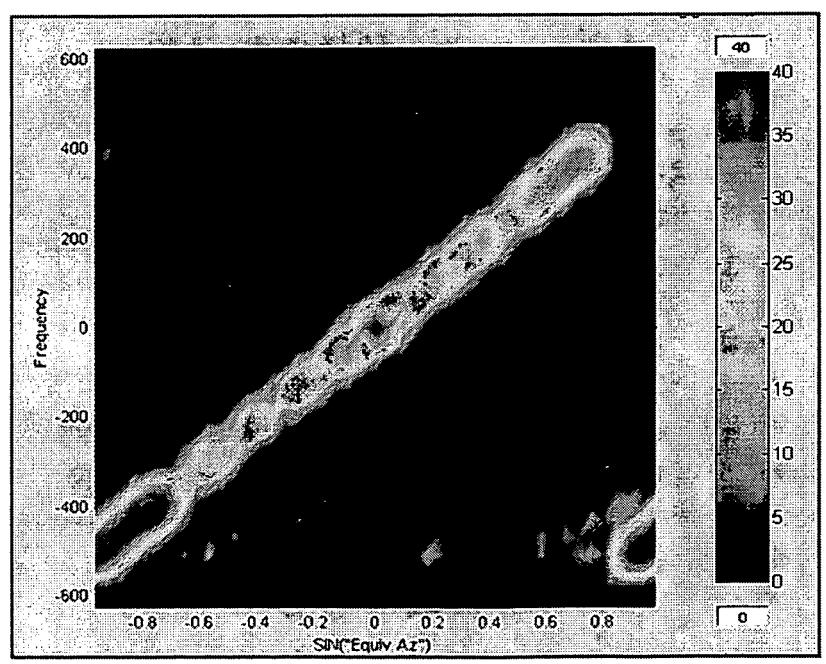

FIG. 15b shows the SINR over the space-time aperture for an example airborne bistatic radar simulation. FIG. 15b shows the compression of the interference due to clutter to a region that coincides with the linear clutter locus for the scenario. The compression of the clutter is similar in concept to traditional clutter tuning approaches, but is accomplished without any constraints on bistatic platform motion. The logarithmic scale in FIG. 15a provides a direct measure of SINR. FIG. 15b demonstrates the improvement in bistatic radar performance without the application of STAP or other clutter mitigation processing that is obtained with this invention.

An alternate embodiment is called the Distributed Bistatic Beamformer. The Distributed Bistatic Beamformer is comprised by the direct, non-adaptive application steering vectors to the TAXO-R output. The output of the Distributed Bistatic Beamformer is a 4-dimensional array of measurements. The 4-dimensional array is spanned by a temporal 2-dimensional sub-space and a spatial 2-dimensional sub-space. Measurements in the 2-dimensional temporal sub-space correspond to delay and Doppler or delay and slow-time. Measurements in the 2-dimensional spatial sub-space correspond to transmitter and receiver angle measurements. The 2-dimensional sub-space for a selected delay-Doppler or delay-time measurement is called the Characteristic Bistatic Aperture. For the current embodiment, the Characteristic Bistatic Aperture provides simultaneous unbiased angle measurements of clutter sources relative to the transmitter and relative to the receiver.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A bistatic radar system comprising:
   a transmitter comprising:
      a programmable waveform generator for creating an array of multiple independent transmitter waveforms;
      a plurality of RF sections for transmitting said independent transmitter waveforms, wherein said RF sections translate said array of transmitter waveforms from IF to RF, amplify said array of transmitter waveforms, and use phase shifts and channel weighting to displace, shape and steer an array of transmitter beams for said array of transmitter waveforms; and
   a receiver comprising:
      a plurality of RF sections for receiving a radar signal, wherein each said RF section amplifies an array of transmitted signals, translates said array of transmitted signals from RF to IF, and uses phase shifts and channel weighting to displace, shape and steer an array of receiver beams;
      a plurality of digital elements for sampling and processing said array of receiver beams;
      means for generating an array of waveforms identical to said array of transmitter waveforms;
      a transmit aperture expansion on receive module for computing bistatic measurements;
      means for reduced rank clutter mitigation; and
      means for detecting a moving target.

2. A bistatic radar system according to claim 1, wherein said array of transmitter waveforms comprises at least one of: (a) approximately orthogonal waveforms with a common center frequency; (b) non-recurring waveforms with random or pseudo-random sample-to-sample phase with a common center frequency and (c) Vandermonde-LaGrange waveforms.

3. A bistatic radar system according to claim 1 wherein said plurality of receiver RF sections comprises at least one of (a) a plurality of sub-apertures with spatially separated phase centers through which said array of data are received; and (b) a plurality of receiver beams with distinct beam centers or pointing direction through which said array of waveforms are received.

4. A bistatic radar system according to claim 1 wherein said means for generating an array of receiver waveforms comprises a programmable waveform generator for creating an array of waveforms identical to said transmitter waveforms.

5. A bistatic radar system according to claim 1 wherein said means for generating an array of receiver waveforms comprises:
   a direct path antenna; and
   a means for filtering data from said direct path antenna data into an array of waveforms identical to said transmitter waveforms.

6. A bistatic radar system according to claim 1, wherein said transmit aperture expansion on receive module comprises a means for decomposing a received signal into a plurality of distributed bistatic measurements, wherein each of said plurality of distributed bistatic measurements comprises signal energy that has been scattered by a specific transmitter element and received by a specific receiver element.

7. A bistatic radar system according to claim 6, wherein each of said plurality of distributed bistatic measurements further comprises signal energy that has been delayed by a specific value relative to a direct path signal and Doppler shifted by a specific value relative to the direct path signal.

8. A bistatic radar system according to claim 7 wherein said means for decomposing a received signal into a plurality of distributed bistatic measurements comprises:
   means for generating a Complex Ambiguity Function by filtering said array of radar signals into a plurality of signal components, each said signal component comprising energy delayed by a specific value and Doppler shifted by a specific value relative to the direct path signal;
   means for filtering said Complex Ambiguity Function into a second plurality of signal components, each of said second plurality of signal components comprising energy scattered by a specific transmit element and received by a specific receiver element; and
   means for generating a plurality of 4-dimensional labels for components of signal energy.

9. A bistatic radar system according to claim 6 wherein said plurality of generalized bistatic aperatures are coherent.

10. A bistatic radar system according to claim 1 wherein said means for reduced rank clutter mitigation comprises:
    means for bistatic aperture compression; and
    means for STAP processing.

11. A bistatic radar system according to claim 10 wherein said means for bistatic aperture compression comprises:
   means for defining coordinates for a generalized bistatic aperture;
   means for rotating the generalized bistatic aperture;
   means for defining coordinates for the rotated generalized bistatic aperture;
   means for re-sampling signal data on the rotated generalized bistatic aperture;
   means for defining steering vectors for the generalized bistatic aperture;
   means for defining steering vectors for the rotated generalized bistatic aperture; and
   means for projection.

12. A bistatic radar system according to claim 11 wherein said means for rotating said generalized bistatic aperture comprises:
   means for computing a rotation angle; and
   means for applying the rotation to the generalized bistatic coordinates.

13. A bistatic radar system according to claim 11 wherein said means for re-sampling signal data comprises:
   means for selecting bistatic aperture samples in the rotated grid that are aligned with rotated coordinate axes;
   means for determining coordinates of the generalized bistatic aperture samples in a rotated grid; and
   means for interpolating values of signal data at samples in said rotated grid as a function of values of signal data at coordinates of an original grid.

14. A bistatic radar system according to claim 11 wherein said means for defining a steering vector comprises:
   means defining coordinate samples for steering vectors associated with the generalized bistatic aperture;
   means for defining coordinate samples for steering vectors associated with the rotated aperture;
   means for defining the steering vectors as a function of coordinates; and
   means for decomposition into vertical and horizontal steering vectors.

15. A bistatic radar system according to claim 11 wherein said means for projection comprises:
   means for weighting signal data on the rotated grid by vertical steering vectors; and
   means for summing weighted signal data along the horizontal axis of the rotated generalized bistatic aperture.

16. A bistatic radar system according to claim 10 wherein said means for bistatic aperture compression generates a line or set of parallel lines in a 2-dimensional space wherein the slope of the line or lines is delay independent.

17. A bistatic radar system according to claim 10, wherein said means for STAP processing comprises:
   means for filtering signal data to form a lower-dimensional sub-space of signal data; and
   means for application of STAP processing to the sub-space of projected data spanned by horizontal steering vectors.

18. A bistatic radar system according to claim 8, further comprising means for Reduced Rank STAP processing.

* * * * *